(12) United States Patent
Lu et al.

(10) Patent No.: US 9,332,549 B2
(45) Date of Patent: May 3, 2016

(54) SERVICE LAYER RESOURCE PROPAGATION ACROSS DOMAINS

(71) Applicant: Convida Wireless LLC, Wilmington, DE (US)

(72) Inventors: Guang Lu, Dollard-des-Ormeaux (CA); Dale N. Seed, Allentown, PA (US); Paul L. Russell, Jr., Pennington, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 14/181,168

(22) Filed: Feb. 14, 2014

(65) Prior Publication Data

US 2014/0233473 A1 Aug. 21, 2014

Related U.S. Application Data

(60) Provisional application No. 61/765,325, filed on Feb. 15, 2013.

(51) Int. Cl.
| | |
|---|---|
| *H04W 60/00* | (2009.01) |
| *H04W 88/16* | (2009.01) |
| *G06F 15/177* | (2006.01) |
| *H04W 72/04* | (2009.01) |
| *H04W 4/00* | (2009.01) |
| *H04L 29/08* | (2006.01) |

(52) U.S. Cl.
CPC .............. *H04W 72/048* (2013.01); *H04L 67/16* (2013.01); *H04L 67/288* (2013.01); *H04W 4/005* (2013.01); *H04L 67/12* (2013.01)

(58) Field of Classification Search
USPC .................................. 370/328, 329, 335, 392
See application file for complete search history.

(56) References Cited

U.S. PATENT DOCUMENTS

| | | | |
|---|---|---|---|
| 2006/0248206 A1 | 11/2006 | Moerdijk | |
| 2013/0212236 A1* | 8/2013 | Foti et al. | 709/221 |
| 2013/0336222 A1* | 12/2013 | Lu et al. | 370/328 |

OTHER PUBLICATIONS

Lu et al. (Provational application No. 61431212).*
"Machine-to-Machine Communications (M2M); Functional Architecture; 00002ed211v2012 M2M Functional Architecture" ETSI Draft; 00002ed211v2012 M2M Functional Architecture, European Telecomunications Standards Institute (ETSI), 650, Route Des Lucioles; F-06921 Sophia-Antipolis; France, M2M, V2.0.12, Jan. 25, 2013, 1-301.
"Machine-to-Machine Communications (M2M); Functional Architecture; ETSI TS 102 690 V2-0-14 Clean", ETSI Draft; ETSI TS 102 690 V2-0-14 Clean, European Telecomunications Standards Institute (ETSI), 650, Route Des Lucioles; F-06921 Sophia-Antipolis; France, SmartM2M, V2.0.14, Jul. 5, 2013, 1-332.
International Patent Application No. PCT/US2014/016518: International Search Report and Written Opinion dated Feb. 6, 2014, 14 pages.

* cited by examiner

*Primary Examiner* — Edan Orgad
*Assistant Examiner* — Sithu Ko
(74) *Attorney, Agent, or Firm* — Baker & Hostetler LLP

(57) ABSTRACT

Techniques are disclosed for Machine-to-Machine (M2M) Announce procedures that allow advertisement machine-to-machine service capabilities layer resources and subresources. Resource structures and signal flows of the various disclosed embodiments are defined.

17 Claims, 18 Drawing Sheets

SERVICE LAYER RESOURCE PROPAGATION ACROSS DOMAINS

CROSS-REFERENCE TO RELATED APPLICATIONS

This application claims the benefit of U.S. Provisional Patent Application No. 61/765,325, filed on Feb. 15, 2013, entitled "MECHANISM FOR SERVICE LAYER RESOURCE PROPAGATION", the contents of which are hereby incorporated by reference herein.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate with each other and over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

An M2M entity (e.g., an M2M functional entity such as device, gateway, server/platform that may be implemented by hardware, software, or a combination of hardware and software) may provide an application or service. For example, a light sensor may provide data indicating detected light levels or a thermostat may provide temperature data and the ability to adjust air conditioning controls. This data may be made available as a "resource" that may be accessed by other M2M entities and that essentially serves as a means to exchange data between M2M entities. A resource may be a uniquely addressable representation of data that may be addressed using a Universal Resource Indicator (URI). The availability of such resources may be communicated among M2M entities via the M2M service capabilities layer (SCL) using a mechanism called "Announce" that allows these entities to advertise and discover available resources in an M2M communication system. The M2M SCL is a functional entity that may be implemented by hardware and/or software and that provides functions exposed on reference points (i.e., functional interfaces between M2M entities). For example, the M2M SCL may provide common (service) functionalities that are shared or commonly used by different M2M applications and/or services. These common functionalities may be exposed using a set of open interfaces. For example, M2M service capabilities may use cellular core network functionalities through a set of exposed interfaces (e.g., existing interfaces specified by 3GPP, 3GPP2, ETSI TISPAN, etc.) and may also interface to one or more other core networks. Because devices offering resources may be simple devices, communications announcing a resource are often handled by a more intelligent device referred to as a "hosting" SCL entity that may be where the original resource resides. Like other M2M communications at the SCL, resource announcements are made using logical communications interfaces at each entity called "reference points" that are independent of the physical communications interfaces and the actual communications path below the application layer between any communicating M2M entities.

M2M devices and entities are typically organized into M2M network domains. In many implementations, an M2M server configured with a network SCL entity (NSCL) may maintain resources and resource data for use by other devices (e.g., other M2M devices and M2M gateways) in the same M2M network domain. However, in current M2M implementations, an SCL entity can only announce resources associated with an application registered with the SCL to other SCL entities in its own network domain. The announcement procedures currently in use are limited to announcing application resources by SCL entities (may be referred to simply as "SCLs") rather than also allowing announcement of the SCLs, and only facilitate announcements to the NSCL in the same network domain as the device announcing the resource.

SUMMARY

Embodiments disclosed herein include methods for a machine-to-machine network node in one domain to generate a request to advertise a resource or a services capabilities layer entity in that domain and to transmit the request to another machine-to-machine network node in another domain via an inter-domain reference point between the nodes.

Embodiments disclosed herein further include a machine-to-machine network node that executes instructions to effectuate operations including generating a request to advertise a resource in that node's domain and transmitting the request to another machine-to-machine network node in another domain via an inter-domain reference point between the nodes.

Embodiments disclosed herein further include a computer-readable medium having computer-readable instructions stored thereon that, when executed, effectuate operations including generating a request to advertise a resource in a node's domain and transmitting the request to another machine-to-machine network node in another domain via an inter-domain reference point between the nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

Figure 1:
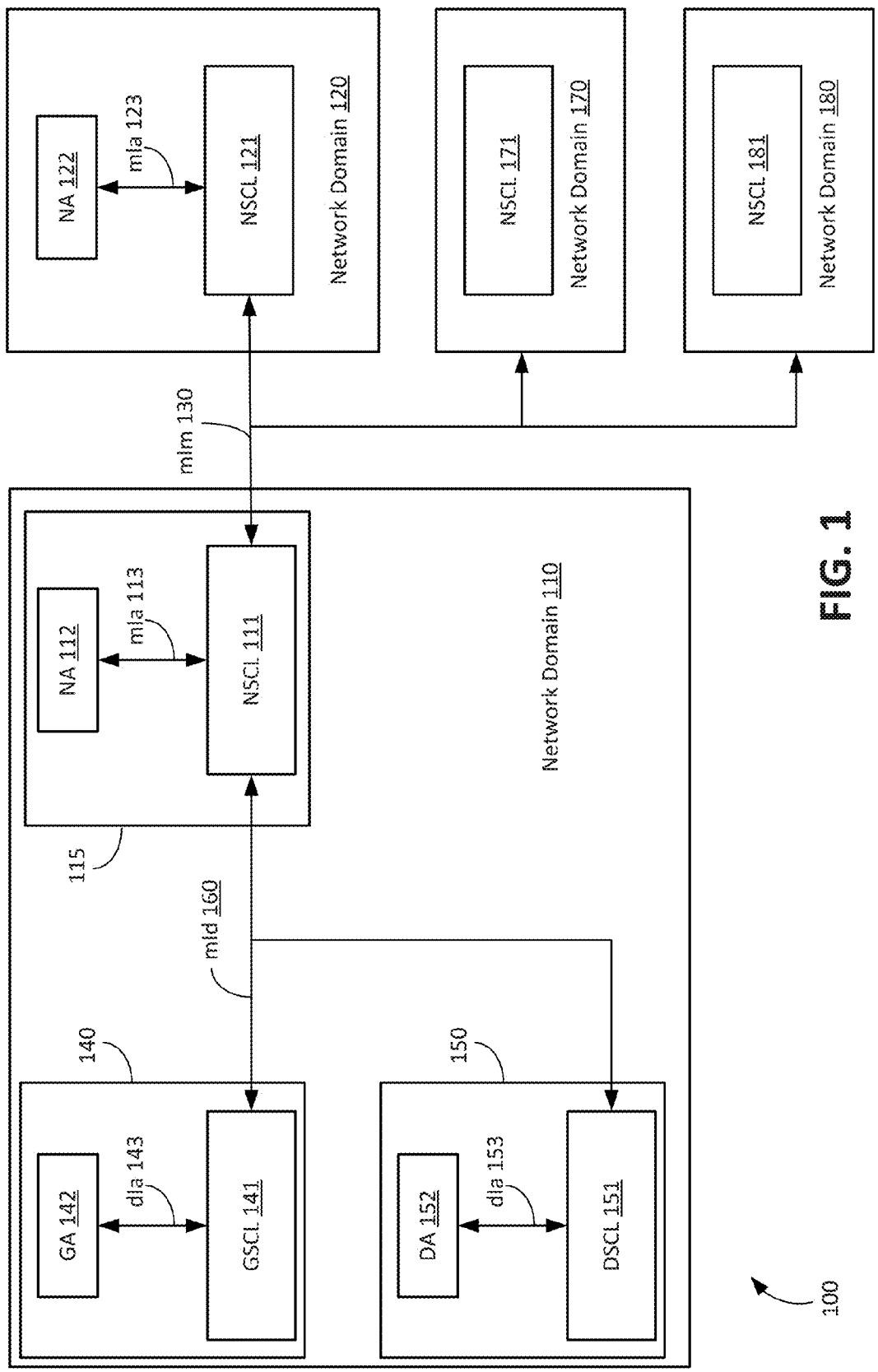
FIG. 1 illustrates an exemplary M2M system including devices and reference points.

ETSI M2M TS 102 690 V2.0.12 (herein: "ETSI M2M specification") defines a mechanism called "Announce" that allows one service layer entity to advertise its resources to other entities, thereby facilitating the use of resources by multiple entities. The instant disclosure may refer to this specification and/or use terms as they are understood in this specification to aid in the understanding of the disclosed embodiments.

The embodiments set forth herein are described in terms of a representational state transfer (REST) architecture, with components and entities described conforming to the constraints of a REST architecture (RESTful architecture). A RESTful architecture is described in terms of the constraints applied to components, entities, connecters, and data elements used in the architecture rather than in terms of physical component implementation or communications protocols used. Thus, the roles and functions of the components, entities, connecters, and data elements will be described. In a RESTful architecture, representations of uniquely addressable resources are transferred between entities. The ETSI M2M specification has standardized the resource structure that resides on a SCL. When handling resources in a RESTful architecture, there are basic methods that may be applied to resources, such as Create (create child resources), Retrieve (read the content of the resource), Update (write the content of the resource) or Delete (delete the resource.) One skilled in the art will recognize that implementations of the instant embodiments may vary while remaining within the scope of the present disclosure. One skilled in the art will also recognize that the disclosed embodiments are not limited to implementations using the ETSI M2M architecture that is used herein to describe exemplary embodiments. The disclosed embodiments may be implemented in other architectures and systems, such as oneM2M and other M2M systems and architectures.

As discussed above in the Background section, in current M2M implementations, an SCL entity can only announce resources associated with an application to other SCL entities in its own network domain. Moreover, the announcement procedures currently in use are limited to announcing resources associated with an application (may be referred to as simply a "resource") by SCL entities (may be referred to simply as "SCLs") rather than also allowing announcement of resources representing the SCL (may be referred to simply as an "SCL resource"), and only facilitate announcements to the NSCL in the same network domain as the entity announcing the resource. Embodiments described hereinafter improve upon the existing announce mechanism, enabling an SCL to announce an SCL resource and its subresources to other SCLs. For example, an NSCL may advertise resources and SCL resources in the NSCL's domain to one or more other NSCLs in different domains. Alternatively, other SCLs, such as gateway SCLs (GSCLs) and device SCLs (DSCLs) may also advertise resources and SCL resources to one or more other SCLs in the same or in a different domain. This allows access to SCL resources and resources in one network domain by M2M entities in different network domains.

FIG. 1 illustrates an exemplary ETSI M2M system 100 that may be used in some disclosed embodiments. Note that this example system is simplified to facilitate description of the disclosed subject matter and is not intended to limit the scope of this disclosure. Other devices, systems, and configurations may be used to implement the embodiments disclosed herein in addition to, or instead of, a system such as system 100, and all such embodiments are contemplated as within the scope of the present disclosure.

System 100 may include M2M devices and entities in network domains 110 and 120. NSCL 111 may be in domain 110 and configured with network application (NA) 112 at M2<server platform 115. NA 112 and NSCL 111 may communicate via reference point mIa 113. The mIa reference points may allow a NA to access the M2M Service Capabilities available from an NSCL in an M2M domain. Also within network domain 100 may be GSCL 141 and gateway application (GA) 142 that may be configured at M2M gateway device 140. GSCL 141 and GA 142 may communicate using reference point dIa 143. Further within network domain 100 may be DSCL 151 and device application (DA) 152 that may be configured at M2M device 150. DSCL 151 and DA 152 may communicate using reference point dIa 153. Each of GSCL 141 and DSCL 151 may communicate with NSCL 111 using reference point mId 160. In general, dIa reference points allow device and gateway applications to communicate with their respective local service capabilities (i.e., service capabilities available at a DSCL and a GSCL, respectively). The mId reference point allows an M2M SCL residing in an M2M Device (e.g. DSCL 151) or an M2M Gateway (e.g. GSCL 141) to communicate with the M2M Service Capabilities in the Network Domain and vice versa (e.g., NSCL 111).

NSCL 121 may be in domain 120 with NA 122. NA 122 and NSCL 121 may communicate via mIa reference point 123. mIm reference point 130 may be an inter-domain reference point that allows M2M network nodes in different network domains, such as NSCL 111 in network domain 110 and NSCL 121 in network domain 120, to communicate with one another. In embodiments of the methods and apparatus described hereinafter, such inter-domain communication may be used to announce resources and SCL resources across domains.

An SCL may announce a resource only to SCLs with which it has registered and that are able to accept the announcement request. In an embodiment, procedures that are used to announce a resource to all potential "Announced-to SCLs" may use one or both of the relevant mIa or dIa and the mId reference point. An Announced-to SCL is an SCL containing an "announced resource" whose content may refer to the original resource hosted by a hosting SCL. The announced resource is an actual resource that may consist of only a limited set of attributes, such as a link to the original resource hosted by another SCL (a hosting SCL), search strings and access rights. The announced resource facilitates a discovery of the original resource hosted by the hosting SCL so that the issuer of the discovery request does not have to contact all SCLs in order to find the original resource. If the original issuer of an announcement is an application, such as GA 142, DA 152, or NA 122, then the announcement may be triggered on the respective mIa or dIa reference point. For example, dIa 143 may be used to trigger an announcement for GA 142 and dIa 153 may be used to trigger an announcement for DA 152. The announcement may then be sent (executed) to NSCL 111 using mId 160. If the original issuer of an announcement request is an SCL, such as GSCL 141 or DSCL 151, then the announcement may be both triggered and executed on mId 160. Where the original issuer of an announcement request is an SCL such as GSCL 141 or DSCL 151, an application may request to be notified of the status of the announcement. Applications may use information announced to an SCL to access the resource. For example, a link and/or search strings for an announced application may be used by another application to communicate with the announced application.

In an embodiment, where the issuer of an announcement request is an application (e.g., NA 122, GA 142, DA 152), the application may request to announce a resource to other SCLs by changing the appropriate attribute of the resource. The trigger to begin the announcement procedure may be the registration of the issuer with its local SCL. For example, when GA 142 registers with GSCL 141 in network domain 110, the registration may trigger the start of the process to announce the resources of GA 142. Alternatively, the creation of a new resource on the local SCL, such as the creation of a new resource for DA 152 on DSCL 151 in network domain 110, or an update of a resource on the local SCL, such as an update of a resource associated with NA 122 on NSCL 121 in network domain 120, may trigger the start of the process to announce the resources of the respective application.

Figure 2:
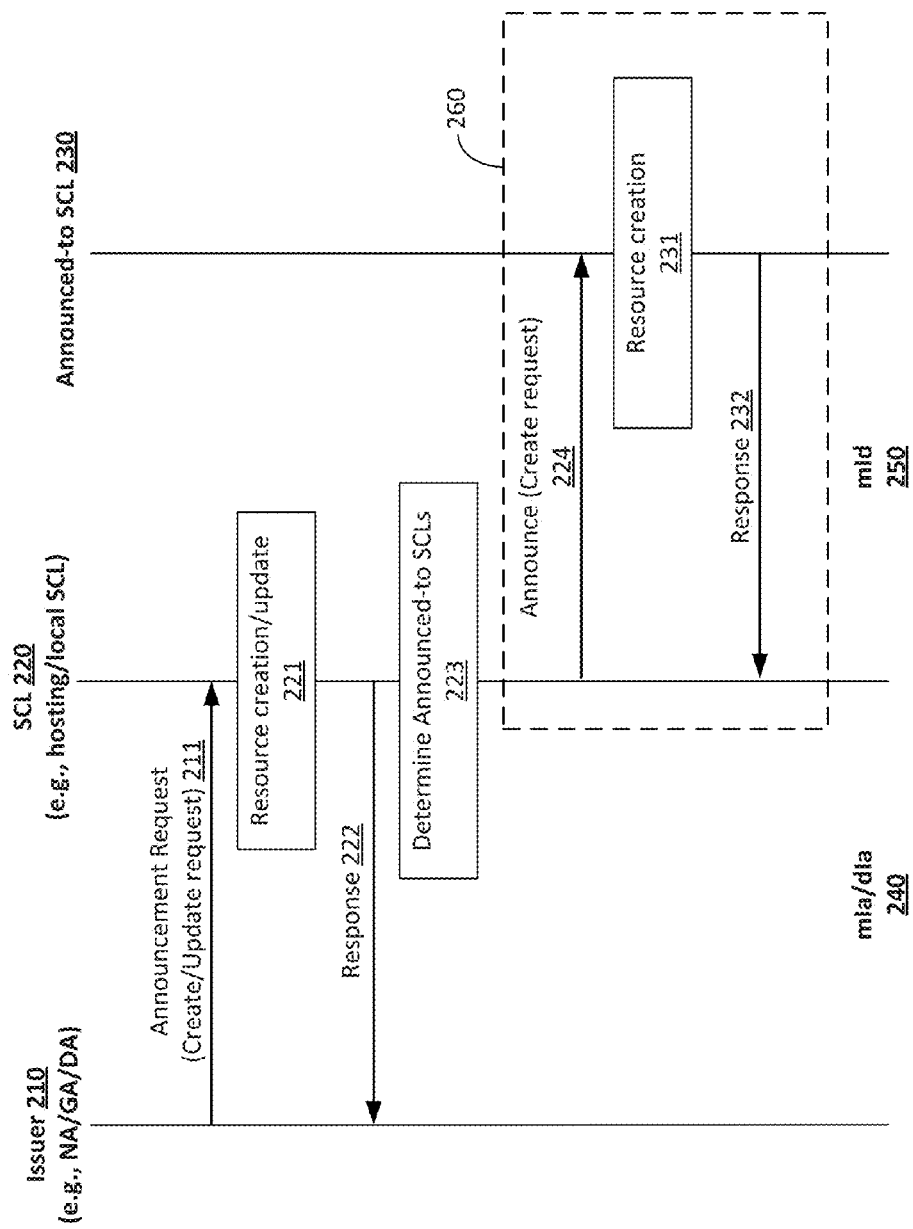
FIG. 2 illustrates an exemplary signal flow of procedures to announce resources within a domain.

FIG. 2 illustrates a signal flow of a resource announcement procedure. To request announcement of resources associated with an application (e.g. NA, GA or DA), issuer 210 may transmit announcement request 211 to SCL 220 via mIa or dIa reference point 240, which may be a local SCL that may also, but need not be, a hosting SCL. Announcement request 211 may be a Create request that is generated upon registration of issuer 210 with SCL 220. Alternatively, announcement request 211 may be requesting the creation of a new resource for issuer 210 on SCL 220 (i.e., a resource not previously created for issuer 210 on SCL 220). In another alternative, announcement request 211 may be an Update request requesting an update of an existing resource for issuer 210 on SCL 220 (i.e., a resource already hosted by SCL 220 for issuer 210).

Announcement request 211 may include one or more announce attributes provided in a list, referred to as an "announce attribute list", where each attribute includes information regarding the scope of the announcement. Such attributes may include the type of announcement being requested. The attributes may further indicate that the issuer will determine the specific SCLs to which an announcement is to be made by listing those SCLs in the announce attribute list or announcement request 211, or they may indicate that the local SCL is to make the determination of the SCLs to which the announcement is to be made. The attributes may further indicate whether the announce operation needs to be confirmed to the issuer. Announce operation confirmation may be used for all interface procedures or only a subset of such procedures. These attributes may further indicate whether announcement is enabled (e.g., active or inactive). By using the inactive attribute, the announce attribute list may be populated at the local SCL (e.g., SCL 220), but the announcement may not be made from the local SCL to other SCLs (e.g., SCL 230). Use of the inactive attribute may only be allowed at resource creation and may be used to prevent an SCL from announcing the resource until an active attribute is received. In some embodiments, once an announcement is indicated as active, use of the inactive attribute may not be allowed or accepted.

The attribute list may be applicable to all announceable resources for which issuer 210 may request creation or update on SCL 220. The attribute list that is provided by issuer 210 at registration with SCL 220 may be referred to as the issuer 210's default attribute list. Issuer 210's announceable resources may also provide their own respective attribute list, in which case issuer 210's default attribute list may not be used for that particular resource. Updates or changes to the default attribute list by issuer 210 are not propagated to previously created announceable resources on SCL 220, but any new announceable resources of issuer 210 may be requested using the updated default attribute list. To change attributes of an existing resource on SCL 220, issuer 210 may transmit an update to SCL 220 for the resource that includes an updated attribute list.

SCL 220 may validate received announcement request 211 by determining that issuer 210 is on a list of issuers authorized to announce resources. This list may be labeled "access-Rights". If not validated (e.g., because issuer 210 is not registered at SCL 220, issuer 210 is not authorized to create or update the requested resource on SCL 220, or the attribute included in announcement request 211 are not allowable), SCL 220 may not perform any of the announcement procedures, and in some embodiments may return an error message to issuer 210. If validated, at block 221, SCL 220 may create or update the resource representing an application (e.g., NA, GA, or DA). If there are no attributes provided in announcement request 211, SCL 220 may use the current default attribute list for issuer 210 in creating the new requested resource. A response 222 may be transmitted to issuer 210 via mIa or dIa reference point 240 confirming that issuer 210 is authorized to request the creation of resources on SCL 220. SCL 220 may send this response prior to or after the completion of the announce procedure.

Note that in an embodiment, where issuer 210 is an application and does not indicate in announcement request 211 the SCLs to which SCL 220 should announce, SCL 220 sends response 222 via mIa or dIa reference point 240 to issuer 210 prior to the completion of the announce procedure using mid reference point 250 described below. In this embodiment, SCL 220 decides when and to which SCLs to announce the resource. In another embodiment, wherein issuer 210 is an application and announcement request 211 indicates the SCLs to which SCL 220 should announce, the SCL 220 sends response 222 to issuer 210 (via mIa or dIa reference point 240) after it has completed announcing the resource to all the indicated SCLs. In this embodiment, response 222 may indicate to issuer 210 the status of the announced resources (i.e., whether the resource was successfully created at each of the indicated SCLs). In this embodiment, response 222 may include a list of the SCLs that were announced to successfully.

In another embodiment, announcement request 211 may indicate that no confirmation is required, and therefore in this embodiment response 222 may not be sent. In other embodiments, where announcement request 211 is an Update request rather than a Create request, and where an indication that no confirmation is required is included in announcement request 211, response 222 is not sent, but when announcement request 211 is a Create request response 222 is transmitted regardless.

In response to determining that announcement request 211 is valid, SCL 220 may continue announce procedure processing at block 223 and determine when and to which SCLs to announce the newly created or updated resource.

Announce resource request 224 may be transmitted via reference point mId 250 to Announced-to SCL 230. Announce resource request 224 may be referred to simply as an "Announce", and may be a "Create" request requesting the creation of a resource. Announce 224 may include search strings and a link to the created resource.

Announced-to SCL 230 may validate Announce 224, in an embodiment, similarly to the process used by SCL 220 to validate announcement request 211, but other embodiments using alternate methods of validation are contemplated as within the scope of the present disclosure. In an embodiment, creation of the resource may only be allowed if SCL 220 is included in Announced-to SCL 230's accessRight list of entities authorized to announce resources to Announced-to SCL 230.

At block 231, Announced-to SCL 230 may attempt to create the requested resource, for example, an announced resource that represents an active announcement of the application (NA, GA or DA), with the specified attributes if SCL 220 has successfully been validated. If Announced-to SCL 230 determines that SCL 220 is permitted to announce resources to Announced-to SCL 230, Announced-to SCL 230 will proceed with generating and populating memory space to contain announced resource data and taking any other steps needed to prepare for, and conduct, announcement of the resource.

Upon completion of the processing at block 231, Announced-to SCL 230 may transmit response 232 that may indicate whether the creation of the announced resource was successful or unsuccessful. If the announced resource was not created at Announced-to SCL 230 (e.g., because SCL 220 is not registered at Announced-to SCL 230, SCL 220 is not authorized to create the requested resource on Announced-to SCL 230, or the attribute(s) included in request 224 are not allowable), SCL 220 may not perform any of the announcement procedures, and in some embodiments may return an error message to issuer 210. If creation of the announced resource at Announced-to SCL 230 was successful, response 232 includes an identifier (e.g., a uniform resource identifier (URI)) of the announced resource.

Note that SCL 220 may also send Announce 224 to other SCLs as well, and therefore the steps within dashed box 260 may be repeated until the resource is announced to all SCL to which SCL 220 has determined it should be announced. Unless specified in the announce attribute list included in announcement request 211, SCL 220 may determine to which SCLs the resource should be announced. SCL 220 may also provide the corresponding expiration time for the resource.

As an improvement over the existing M2M announce processes, in an embodiment, and referring again to FIG. 1, NSCL 111 may be configured to announce SCL resources, including announceable subresources. Based on an announce attribute list received from another SCL (e.g., GSCL 141, DSCL 151) or from an application (e.g., NA 112, GA 142, DA 152), NSCL 111 may announce a resource to an Announced-to NSCL, such as NSCL 121 in domain 120, via mIm reference point 130 by sending an announcement (e.g., Create request) over mIm reference point 130. If the resource is hosted by NSCL 111 (e.g., a resource originating at NA 112), NSCL 111 may create the announced resource and send an "announce resource" request to the NSCL 121 that includes the announced resource containing, for example, a search strings and the link to the original resource. If the resource has been announced to NSCL 111 by another SCL (e.g., GSCL 141, DSCL 151), the resource is an announced resource at NSCL 111, and NSCL 111 may announce it to NSCL 121 according to the list of specific SCLs to which an announcement is to be made that was included in the attribute list that accompanied the request to create the resource received by NSCL 111. Note that this attribute or list may be referred to as an "announceTo" attribute of the resource.

The ETSI M2M specification defines an <scl> resource that represents a remote SCL that is registered at the SCL storing the <scl> resource. This specification further defines a <sclBase> that is a root resource that included all resources (may be referred to as "subresources") that reside and are available at an SCL storing the <sclBase> resource, including a collection resource (i.e., a resource that represents zero or more other resources) "scls" that contains all <scl> resources representing all SCLs registered on the SCL (or that the SCL is registered to) on which the <sclBase> resource is located (i.e., all SCLs registered at the SCL storing the <sclBase> resource). Thus each remote SCL that is registered with an SCL's <sclBase> is represented by an <scl> resource in that SCL's<sclBase> resource. Likewise, each registered-to SCL is also represented as a sub-set <scl> resource in the registering SCL's <sclBase>. For example, referring again to FIG. 1 and using ETSI resource notation, when GSCL 141 registers with NSCL 111, there are two <scl> resources created, one in GSCL 141—a <sclBase141>/scls/<scl111> resource—and one in NSCL 111—a <sclBase111>/scls/<scl141> resource.

Figure 3:
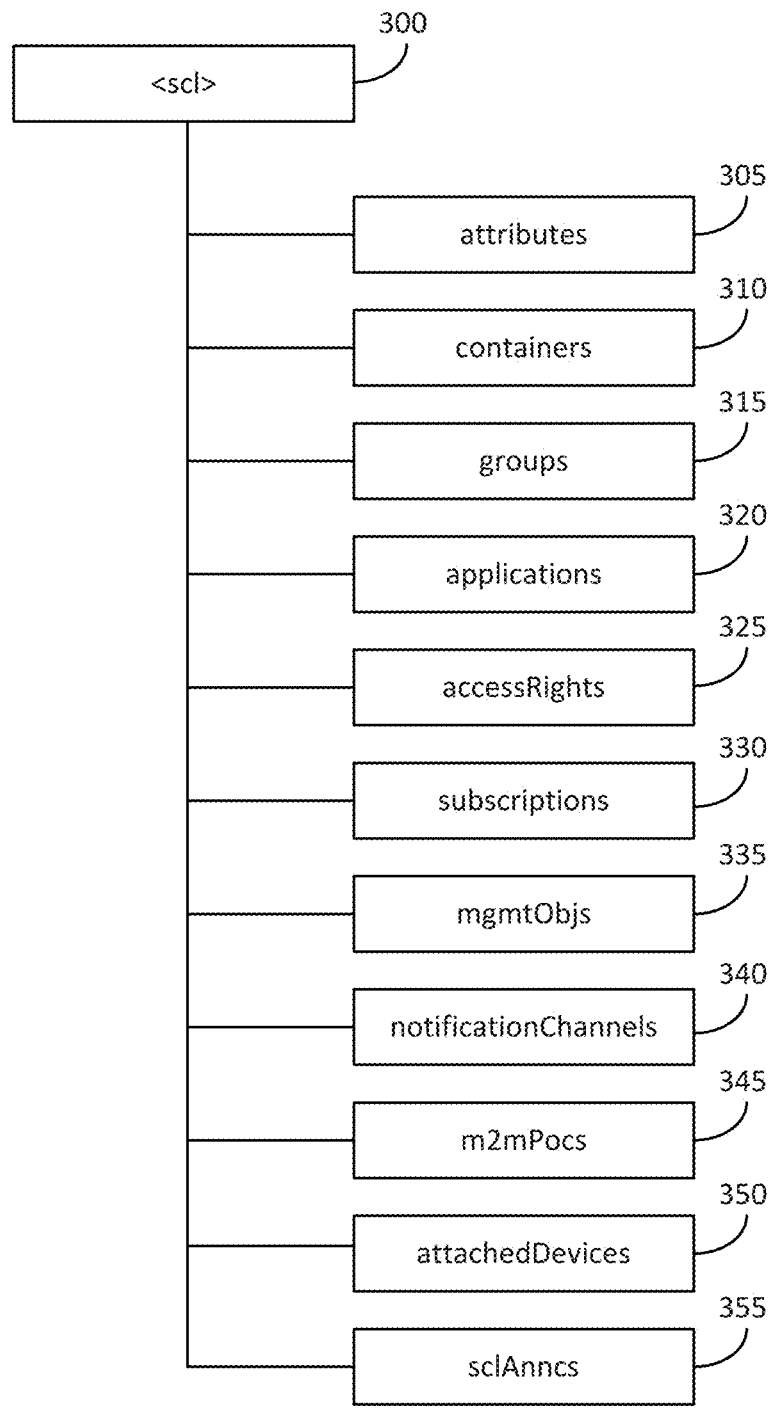
FIG. 3 illustrates an exemplary resource structure.

FIG. 3 illustrates a structure of example <scl> resource 300 that may represent SCLs described in some embodiments, such as those described in regard to FIG. 1. <scl> resource 300 may include one or more attributes 305 and zero or more of each of subresources containers 310, groups 315, applications 320, accessRights 325, subscriptions 330, mgmtObjs 335, notificationsChannels 340, m2mPocs 345, and attachedDevices 350. In some embodiments, other subresources and resource parameters may be used while in other embodiments not all of the subresources and resource parameters shown in FIG. 3 may be used.

As an improvement to the existing M2M announce procedures, in an embodiment, also included under the <scl> resource may be a collection resource representing a set of resources that each represent an announced SCL and its subresources available which may be in a different network domain from that of the entity on which the collection resource is located. This collection resource may be referred to as "sclAnncs" in some embodiments. An example of this collection resource is shown as sclAnncs 355 under <scl> resource 300 of FIG. 3. Also, among attributes 305 may be an "announceTo" attribute that is a list of the SCLs to which an announcement of this <scl> resource 300 should be made. The SCL on which the <scl> resource 300 is configured will attempt to announce resources to the SCLs in the announceTo list. As noted above, if a list of entities to which to announce resources is not provided in an announcement request received over the mIa or dIa reference point, the local SCL will decide where the resource will be announced. Also among attributes 305 may be a "registeredScls" attribute that is a list of SCLs that are registered with the SCL configured with the <scl> resource 300. (For example in FIG. 1, if GSCL 141 registers with NSCL 111 configured with the <scl> resource 300, then GSCL 141 is an element of the registeredScls of NSCL 111.)

sclAnncs resource 355 may include zero or more subresources (e.g., resources of the SCL) that each may be referred to as an <sclAnnc> resource. Each <sclAnnc> resource, an announced SCL resource, represents an active announcement of an SCL. The SCL may be a registered SCL in a different network domain from that of the SCL on which sclAnncs resource 355 is configured. The <sclAnnc> resource is used for announcement of an SCL resource from an SCL to other SCLs, in some embodiments over the mIm reference point.

Figure 4:
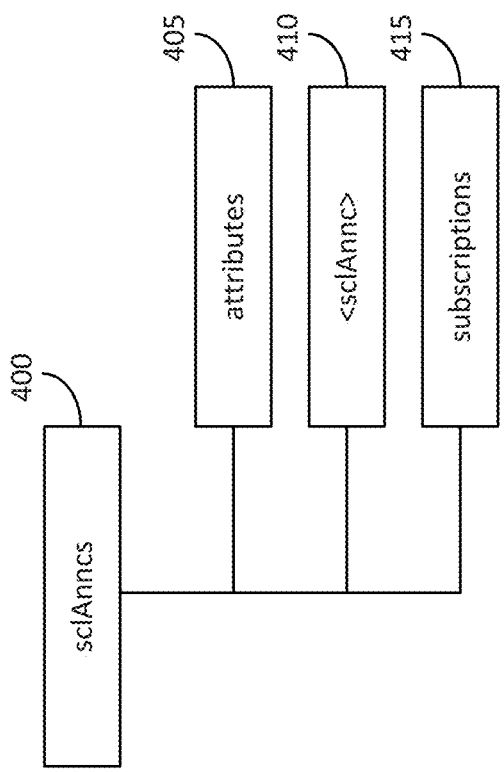
FIG. 4 illustrates another exemplary resource structure.

FIG. 4 illustrates a data structure of example sclAnncs collection resource 400 that may be used to represent an sclAnncs resource such as sclAnncs resource 355 of example <scl> resource 300 of FIG. 3. sclAnncs resource 400 may have attributes 405 that may be any attributes set forth herein or any other attributes. For example, attributes 405 of sclAnncs resource 400 may include an accessRightID attribute that indicates the URI of an access rights resource, which may be referred to as an "accessRight" resource. The permissions defined at the accessRight resource that is referenced in the accessRightID attribute may determine the entities that are allowed to access the resource containing this attribute (in this example, sclAnncs resource 400) and the functions that may be performed (e.g., retrieve, update, delete, etc.). If a resource type does not have an accessRightID attribute definition, then permissions for resources of that type may be determined in other ways, such as by using the permissions associated with a parent resource for the child resource that does not have an accessRightID attribute definition or by using fixed permissions.

Attributes 405 of sclAnncs resource 400 may also include a "creationTime" attribute that indicates the time of creation of sclAnncs resource 400. Attributes 405 of sclAnncs resource 400 may further include a "lastModifiedTime" attribute that indicates the time of the most recent update or modification of sclAnncs resource 400. sclAnncs resource 400 may also include subscriptions 415 that may indicate whether sclAnncs resource 400 may be subscribed to.

sclAnncs resource 400 may also include zero or more subresources <sclAnnc>410 that each represent an active announcement of a (remote) SCL, which may be in a different network domain, that are announced to the SCL on which sclAnncs resource 400 is configured.

Figure 5:
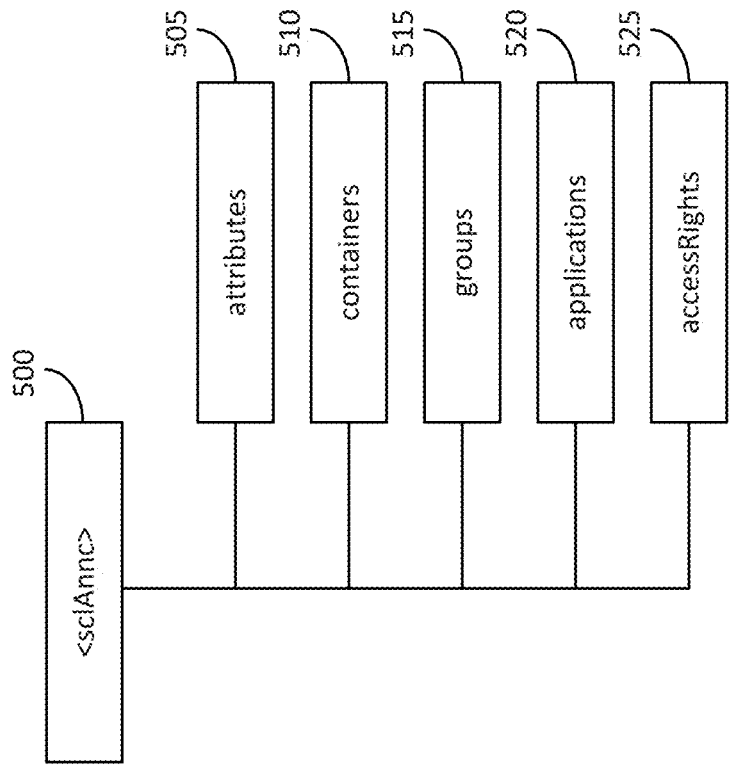
FIG. 5 illustrates another exemplary resource structure.

FIG. 5 illustrates a data structure of an example <sclAnnc> resource 500 which may represent an <sclAnnc> resource such as <sclAnnc> resource 410 of example sclAnncs resource 400 of FIG. 4. This resource represents an active announcement of a registered SCL in another network domain. In accordance with the improved domain-to-domain announce capabilities described herein, <sclAnnc> resource 500, for example, may be used to transmit Announces over the mIm reference point (e.g., mIm 130 in FIG. 1).

<sclAnnc> resource 500 may contain attributes 505 and zero or more subresources containers 510 that may contain <containerAnnc> resources, groups 515 that may contain <groupAnnc> resources, applications 520 that may contain <applicationAnnc> resources that may represent an active announcement of a registered application in another SCL and that may maintain a link to the original resource, and accessRights 525 that may contain <accessRightAnnc> resources, each of which may be a collection resource. Each of these subresources may have a lifetime and scope that are linked to <sclAnnc> resource 500. For example, each resource created as a descendant of announced <sclAnnc> resource 500 may be automatically deleted when the SCL associated with <sclAnnc> resource 500 is deannounced or when the announcement of the SCL expires. The announcing SCL may keep the accessRightID and any searchStrings (tokens used as keys for discovering resources) associated with the resource synchronized with the resource that is announced.

Containers 510 may contain zero or more representations of <containerAnnc> resources, each of which represent a container located at the SCL represented by the <scl> resource under which <sclAnnc> resource 500 and <sclAnnc> resource 500's parent sclAnncs resource are located. Groups 515 may contain zero or more representations of <groupAnnc> resources, each of which may represent a group resource located at the SCL represented by the <scl> resource under which <sclAnnc> resource 500 and <sclAnnc> resource 500's parent sclAnncs resource are located. Applications 520 may contain zero or more representations of <applicationAnnc> resources, each of which may represent an active application located at the SCL represented by the <scl> resource under which <sclAnnc> resource 500 and <sclAnnc> resource 500's parent sclAnncs resource are located. AccessRights 525 may contain zero or more representations of <accessRightAnnc> resources, each of which may represent an <accessRight> resource in another SCL and include a link to the original resource. The represented SCLs may be entities that are permitted to access the SCL represented by the <scl> resource under which <sclAnnc> resource 500 and <sclAnnc> resource 500's parent sclAnncs resource are located.

Attributes 505 may include a link attribute that is a link that references the resource that is announced and associated with <sclAnnc> resource 500. This link may be the reference provided during the discovery process. Attributes 505 may also include an accessRightID attribute that indicates the URI of an access rights resource as described herein. Attributes 505 may also include an announceTo attribute that may be a list of the SCLs to which the associated resource should be announced as described herein. Attributes 505 may also include a searchStrings attribute providing token that may be used as keys for discovering resources. Attributes 505 may further include an expirationTime attribute that defines a time (in some embodiments, an absolute time) after which <sclAnnc> resource 500 will be deleted by the SCL on which it is hosted.

Using ETSI notation, and referring again to FIG. 1, where GSCL 141 is announced to NSCL 121 by NSCL 111, the announcement of GSCL 141 (i.e. as an announced SCL resource representing an active announcement of GSCL 141 resource), may be represented as <nscl121Base>/scls/<nscl111>/sclAnncs/<gscl141Annc>.

In an embodiment, referring to FIG. 1, Announces may be sent over mIm to NSCL 121 by NSCL 111 that announce SCLs and application resources. Such Announces may be made using the sclAnncs collection resource and <sclAnnc> resources representing active announcements of the SCLs and subresources. When NSCL 111 and NSCL 121 register with one another, an <scl> resource is created on each (e.g. <nscl111Base>/scls/<nscl121> is created at NSCL111 and <nscl121Base>/scls/<nscl111> is created at NSCL 121). The announced SCLs may be stored under the <scl> resource created after registration. For example, upon NSCL 111 registering with NSCL 121, GSCL 141 (which is registered to NSCL 111) may be announced to NSCL 121 over mIm reference point 130 if GSCL 141 indicated that it may be announced to any SCLs or at least to NSCL 121. Using ETSI notation, the announced GSCL 141 resource (i.e., a representation of an active announcement of GSCL 141 resource), may be <GSCL141Annc> stored under <nscl121Base>/scls/<NSCL111>/sclAnncs/ as <nscl121Base>/scls/<NSCL111>/sclAnncs/<gscl141Annc>. Once announced to NSCL 121, the announced GSCL 141 resource may be available to entities in domain 120.

An announcing NSCL, such as NSCL 111, may announce the same resource to multiple other NSCLs, such as NSCL 171 in network domain 170, and NSCL 181 in network domain 180. Once announced to the NSCLs, the announced resource may be available to entities in domains 170 and 180, as well as, or instead of, entities in domain 110. Unless specified in the announce attribute list, NSCL 111 may decide to which SCLs to announce to. For resources hosted on NSCL 111, NSCL 111 may also provide an expiration time. For resources announced to NSCL 111 (i.e., not hosted on NSCL 111), NSCL 111 may use the expiration time received in the corresponding resource's Announce as an attribute.

In an embodiment, Announced-to NSCL 121 may receive an announcement of an SCL resource from NSCL 111 and create the announced SCL resource (e.g., <gscl141Annc>) with the specified attributes. Creation may be permitted announcing that NSCL 111 is authorized to create a child resource according to the accessRight defined for the resource. If the creation is successful, Announced-to NSCL 121 may return a response indicating success to NSCL 121 that may include an identifier (e.g., a URI) of the created, announced SCL resource. If the creation is not successful, NSCL 121 may return an error message to NSCL 111.

Figure 6:
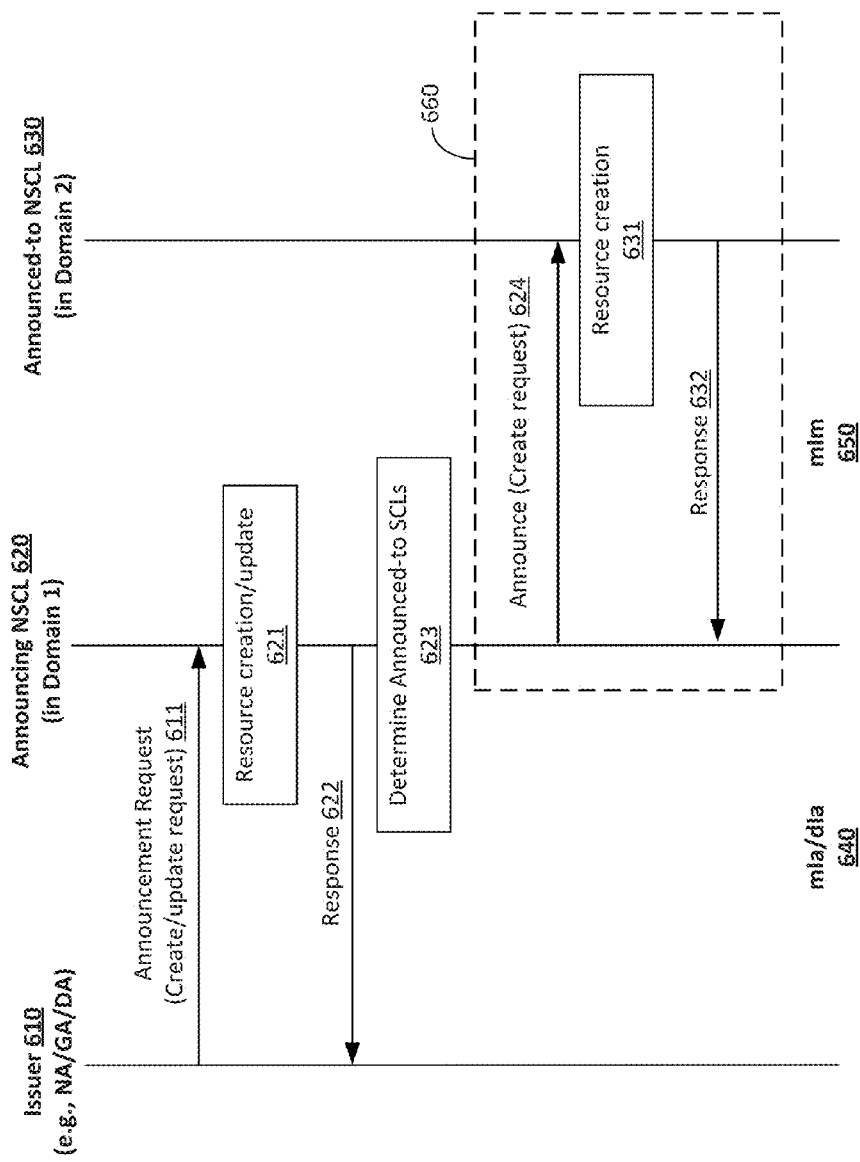
FIG. 6 illustrates an exemplary signal flow of procedures to announce resources between network domains.

FIG. 6 illustrates a signal flow of an embodiment of a resource announcement procedure for announcing resources across domains that may use the data structures and elements of such structures as described above in regard to FIGS. 3-5. In this embodiment, announcement issuer 610 is an application, such as, but not limited to, an NA, GA, or DA as described herein. Announcement issuer 610 may transmit announcement request 611 to NSCL 620 in Domain 1 via an mIa or dIa reference point 640. Alternatively, announcement issuer 610 may be an application that sends announcement request 611 to NSCL 620 via a hosting SCL (e.g., a DSCL hosting a DA or a GSCL hosting a GA). In such an embodiment, the announcement request may be sent first to the hosting SCL via the mIa/dIa interface, and the hosting SCL may transmit the announcement request to NSCL 620 via an mid interface. Announcement request 611 may be a Create request that is generated upon registration of issuer 610 with NSCL 620. Alternatively, announcement request 611 may be a Create request requesting the creation of a new resource for issuer 610 on NSCL 620 (i.e., a resource not previously created for issuer 610 on NSCL 620). In another alternative, announcement request 611 may be an "Update" request requesting an update of an existing resource for issuer 610 on NSCL 620 (i.e., a resource already hosted by NSCL 620 for issuer 610).

Announcement request 611 may include an announce attribute list that includes one or more of any of the announce attributes as described herein, such as those described for attributes 305, 405 and 505 of FIGS. 3, 4, and 5, respectively. The announce attribute list may be applicable to all announceable resources for which issuer 610 may request creation on NSCL 620. The announce attribute list that is provided by issuer 610 at registration with NSCL 620 may be referred to as the issuer 610's default announce attribute list. Issuer 610's announceable resources may also provide their own announce attribute list, in which case issuer 610's default announce attribute list may not be used for that particular resource. Updates or changes to the default announce attribute list by issuer 610 are not propagated to previously created announceable resources on NSCL 620, but any new announceable resources of issuer 610 may be requested using the updated default announce attribute list. To change attributes of an existing resource on NSCL 620, issuer 610 may transmit an update to SCL 620 for the resource that includes an updated announce attribute list.

NSCL 620 may validate received announcement request 611 using methods described herein, for example by determining that issuer 610 is on an accessRights list. If not validated (e.g., because issuer 610 is not registered at NSCL 620, issuer 610 is not authorized to create or update the requested resource on NSCL 620, or the attributes included in announcement request 611 are not allowable), NSCL 620 may not perform any of the announcement procedures, and in some embodiments may return an error message to issuer 610. If validated, at block 621, NSCL 620 may create or update the resource. If there are no attributes provided in announcement request 611, NSCL 620 may use the current default announce attribute list for issuer 610 in creating the new requested resource. Response 622 may be transmitted to issuer 610 via mIa or dIa reference point 640. Response 622 may confirm that issuer 610 is authorized to request the creation or update of resources on NSCL 620. NSCL 620 may send this response prior to or after the completion of the announce procedure.

Note that in an embodiment, where issuer 610 does not indicate in announcement request 611 the SCLs to which NSCL 620 should announce, NSCL 620 sends response 622 to issuer 610 prior to the completion of the announce procedure described below. In this embodiment, NSCL 620 decides when and to which SCLs to announce the resource. In another embodiment, wherein announcement request 611 indicates the SCLs to which NSCL 620 should announce, NSCL 620 sends response 622 to issuer 610 via the mIa or dIa reference point 640 after it has completed announcing the resource to all the indicated SCLs. In this embodiment, response 622 may indicate to issuer 610 the status of the announced resources (i.e., whether the resource was successfully created at each of the indicated SCLs). In this embodiment, response 622 may include a list of the SCLs that were announced to successfully.

In another embodiment, announcement request 611 may indicate that no confirmation is required, and therefore in this embodiment response 622 may not be sent. In other embodiments, where announcement request 611 is an Update request rather than a Create request, and where an indication that no confirmation is required is included in announcement request 611, response 622 is not sent, but when announcement request 611 is a Create request response 622 is transmitted regardless.

In response to determining that announcement request 611 is valid, NSCL 620 may continue announce procedure processing at block 623 and determine when and to which SCLs to announce the newly created or updated resource that is to be announced by the issuer 610.

Announce 624 may be transmitted via reference point mIm 650 to Announced-to NSCL 630 in a different domain (Domain 2) from that of NSCL 620 (Domain 1). Announce 624 may be a Create request requesting the creation of an announced resource that represents an active announcement of a resource to be announced by the issuer 610. Announce 624 requests that Announced-to NSCL 230 create the announced resource that may include search strings and a link to the original resource as described herein.

Announced-to NSCL 630 may validate Announce 624, in an embodiment, similarly to the process used by NSCL 620 to validate announcement request 611, but other embodiments using alternate methods of validation are contemplated as within the scope of the present disclosure. In an embodiment, creation of the resource may only be allowed if NSCL 620 is included in Announced-to NSCL 630's accessRight list of entities authorized to announce resources to Announced-to NSCL 630.

At block 631, Announced-to NSCL 630 may attempt to create the requested resource with the specified attributes if NSCL 620 has successfully been validated.

Upon completion of the processing at block 631, Announced-to NSCL 630 may transmit response 632 that may indicate whether the creation of the announced resource was successful or unsuccessful. If the announced resource was not created at Announced-to NSCL 630 (e.g., because NSCL 620 is not registered at Announced-to NSCL 630, NSCL 620 is not authorized to create the requested resource on Announced-to NSCL 630, or the attribute included in request 624 are not allowable), NSCL 620 may not perform any of the announcement procedures, and in some embodiments may return an error message to issuer 610 in response 632. If creation of the resource at Announced-to NSCL 630 was successful, response 632 may include an identifier (e.g., a uniform resource identifier (URI)) of the resource.

Note that NSCL 620 may also send Announce 624 to other NSCLs as well, and therefore the steps within dashed box 660 may be repeated until the resource required to be announced in announcement request 611 is announced to all NSCLs to which NSCL 620 has determined it should be announced. Unless specified in the announce attribute list included in announcement request 611, NSCL 620 may determine to which SCLs the resource should be announced. NSCL 620 may also provide the corresponding expiration time for the resource.

Figure 7:
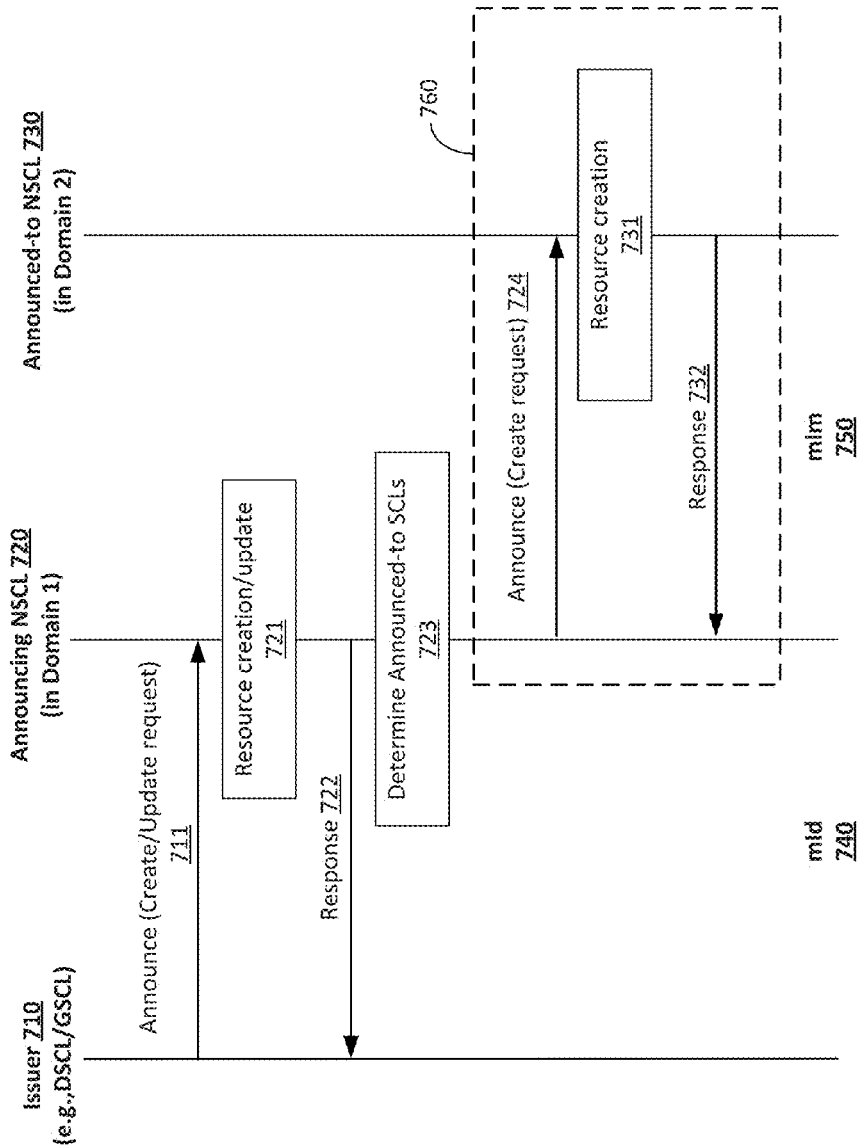
FIG. 7 illustrates an exemplary signal flow of procedures to announce SCLs between network domains.

FIG. 7 illustrates a signal flow of an embodiment of an SCL announcement procedure for announcing SCLs that may use the data structures and elements of such structures as described above in regard to FIGS. 3-5. In this embodiment, announcement issuer 710 is an SCL, such as, but not limited to, a DSCL or a GSCL as described herein. Announcement issuer 710 may transmit announcement request 711 to announce the SCL resource to NSCL 720 in Domain 1 via mId reference point 740. This request may be a Create request that is generated upon registration of issuer 710 with NSCL 720. Alternatively, announcement request 711 may be a Create request requesting the creation of a new resource for issuer 710 on NSCL 720 (i.e., a resource not previously created for issuer 710 on NSCL 720). In another alternative, announcement request 711 may be an "Update" request requesting an update of an existing resource for issuer 710 on NSCL 720 (i.e., a resource already hosted by NSCL 720 for issuer 710).

Announcement request 711 may include an announce attribute list that includes one or more of any of the announce attributes as described herein, such as those described for attributes 305, 405 and 505 of FIGS. 3, 4, and 5, respectively. The announce attribute list may be applicable to all announcements of SCL issuer 710 announced by NSCL 720. Issuer 710 may provide its own announce attribute list. Updates or changes to the announce attribute list by issuer 710 may not be automatically propagated NSCL 720, but such changes may be provided to NSCL 720 by the transmission of an update to SCL 720 that include an updated announce attribute list.

NSCL 720 may validate received announcement request 711 using methods described herein, for example by determining that issuer 710 is on an accessRights list. If not validated (e.g., because issuer 710 is not registered at NSCL 720, issuer 710 is not authorized to create the requested SCL on NSCL 720, or the attributes included in announcement request 711 are not allowable), NSCL 720 may not perform any of the announcement procedures, and in some embodiments may return an error message to issuer 710. If validated, at block 721, NSCL 720 may create or update the SCL resource (e.g., DSCL resource or GSCL resource) stored at NSCL 720. If there are no attributes provided in announcement request 711, NSCL 720 may use the current default announce attribute list for issuer 710 in creating the new requested SCL. Response 722 may be transmitted to issuer 710 via mId reference point 740. Response 722 may confirm that issuer 710 is authorized to request the creation or update of the SCL on NSCL 720. NSCL 720 may send this response prior to or after the completion of the announce procedure.

Note that in an embodiment, where issuer 710 does not indicate in announcement request 711 the SCLs to which NSCL 720 should announce, NSCL 720 sends response 722 to issuer 710 (via the mId reference point 740) prior to the completion of the announce procedure on mIm reference point 750 described below. In this embodiment, NSCL 720 decides when and to which SCLs to announce the resource. In another embodiment, wherein issuer 710 indicates the SCLs to which NSCL 720 should announce, NSCL 720 sends response 722 to issuer 710 via mId reference point 740 after it has completed announcing the SCL to all the indicated SCLs. In this embodiment, response 722 may indicate to issuer 710 the status of the SCL resource required to be announced (i.e., whether the SCL resource was successfully created at each of the indicated SCLs). In this embodiment, response 722 may include a list of the SCLs (i.e., the list of Announced-to SCLs) that were announced to successfully. In another embodiment, announcement request 711 may indicate that no confirmation is required, and therefore in this embodiment response 722 may not be sent. In other embodiments, where announcement request 711 is an Update request rather than a Create request, and where an indication that no confirmation is required is included in announcement request 711, response 722 is not sent, but when announcement request 711 is a Create request response 722 is transmitted regardless.

In response to determining that announcement request 711 is valid, NSCL 720 may continue announce procedure processing at block 723 and determine when and to which SCLs to announce the newly created or updated resource.

Announce 724 may be transmitted via reference point mIm 750 to Announced-to NSCL 730 in a different domain (Domain 2) from that of NSCL 720 (Domain 1). Announce 724 may be a Create request to create an announced SCL resource at Announced-to NSCL 730, which may represent an active announcement of the SCL resource (e.g., DSCL or GSCL) required to be announced by the issuer 710. The announced SCL resource may be configured with an <sclAnnc> resource as shown in FIG. 5 and may include a link to the original resource, as well as an expiration time, accessRight information, and/or search strings as described herein.

Announced-to NSCL 730 may validate Announce 724, in an embodiment, similarly to the process used by NSCL 720 to validate announcement request 711, but other embodiments using alternate methods of validation are contemplated as within the scope of the present disclosure. In an embodiment, creation of the announced SCL resource may only be allowed if NSCL 720 is included in Announced-to NSCL 730's accessRight list of entities authorized to announce SCLs to Announced-to NSCL 730.

At block 731, Announced-to NSCL 730 may attempt to create the requested announced SCL resource with the specified attributes if NSCL 720 has successfully been validated. Such attributes and other data configured for the resource by Announced-to NSCL 730 may include data provided in Announce 724, such as a link to the original resource, an expiration time, accessRight information, and/or search strings.

Upon completion of the processing at block 731, Announced-to NSCL 730 may transmit response 732 that may indicate whether the creation of the announced SCL resource was successful or unsuccessful. If the announced SCL resource was not successfully created at Announced-to NSCL 730 (e.g., because NSCL 720 is not registered at Announced-to NSCL 730, NSCL 720 is not authorized to create the announced SCL resource on Announced-to NSCL 730, or the attributes included in request 724 are not allowable), NSCL 720 may not perform any of the announcement procedures, and in some embodiments may return an error message to issuer 710. If creation of the announced SCL resource at Announced-to NSCL 730 was successful, response 732 includes an identifier (e.g., a uniform resource identifier (URI)) of the announced SCL. If the creation is not successful, response 732 may be an error message.

Note that NSCL 720 may also send Announce 724 to other NSCLs as well, and therefore the steps within dashed box 760 may be repeated until the SCL resource required to be announced by issuer 710 is announced to all NSCLs to which NSCL 720 has determined it should be announced. In the example embodiment described in regard to FIG. 7, an SCL resource is announced from one NSCL to another NSCL over the mIm reference point. However, in other embodiments a similar SCL resource announcement mechanism utilizing the <sclAnnc> resource configuration (see, e.g., FIGS. 3, 4, and 5) may be used where SCL resources are announced between other types of SCLs, such as between GSCLs, DSCLs, or between any combination of different types of SCLs. Unless specified in the announce attribute list included in announcement request 711, NSCL 720 may determine to which SCLs the SCL resource should be announced. NSCL 720 may also provide the corresponding expiration time for the resource.

Figure 8:
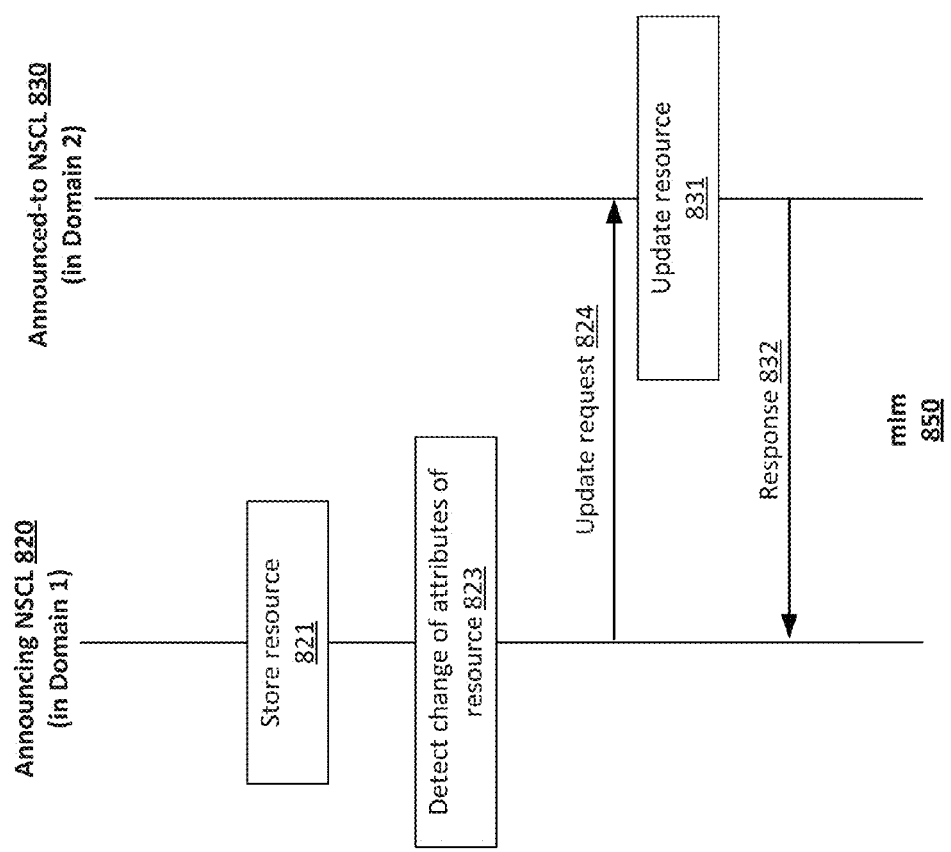
FIG. 8 illustrates an exemplary signal flow of procedures to update resources between network domains.

FIG. 8 illustrates a signal flow of an embodiment of a resource announcement procedure for updating previously announced resources (e.g., announced resources created through methods described in regard to FIG. 6 and FIG. 7) across domains that may use the data structures and elements of such structures as described above in regard to FIGS. 3-5. Changes or updates to a resource may be received by announcing NSCL 820 in Domain 1 over any of the mId, dIa, or mIa reference points. Announcing NSCL 820 may store the resource initially, or following a previous update may store the updated resource, at block 821. At block 823, NSCL 820 may detect a trigger to update a resource. This trigger may be generated by a change of attributes of the original resource, such as a change in the searchStrings attribute or the accessRightID attribute. This change may be detected by receiving an Update from the issuer of the resource or by any other means.

In response to detecting the trigger, NSCL 820 may generate Update request 824 and send request 824 to Announced-to NSCL 830 in Domain 2 via mIm reference point 850. Note that in some embodiments, only the Announcing NSCL that originally announced the resource may be permitted to update the announced resource.

Upon receipt of request 824, Announced-to NSCL 830 may validate the received request using any method or means set forth herein, and may then, upon successful validation, update the announced resource at block 831 with the attributes specified in request 824. If the update of the announced resource succeeded, NSCL 830 may transmit response 832 indicating a successful update of the announced (SCL) resource to NSCL 820 via mIm reference point 850. Otherwise, NSCL 830 may transmit response 832 indicating the update of the resource was not successful to NSCL 820 via mIm reference point 850.

Figure 9:
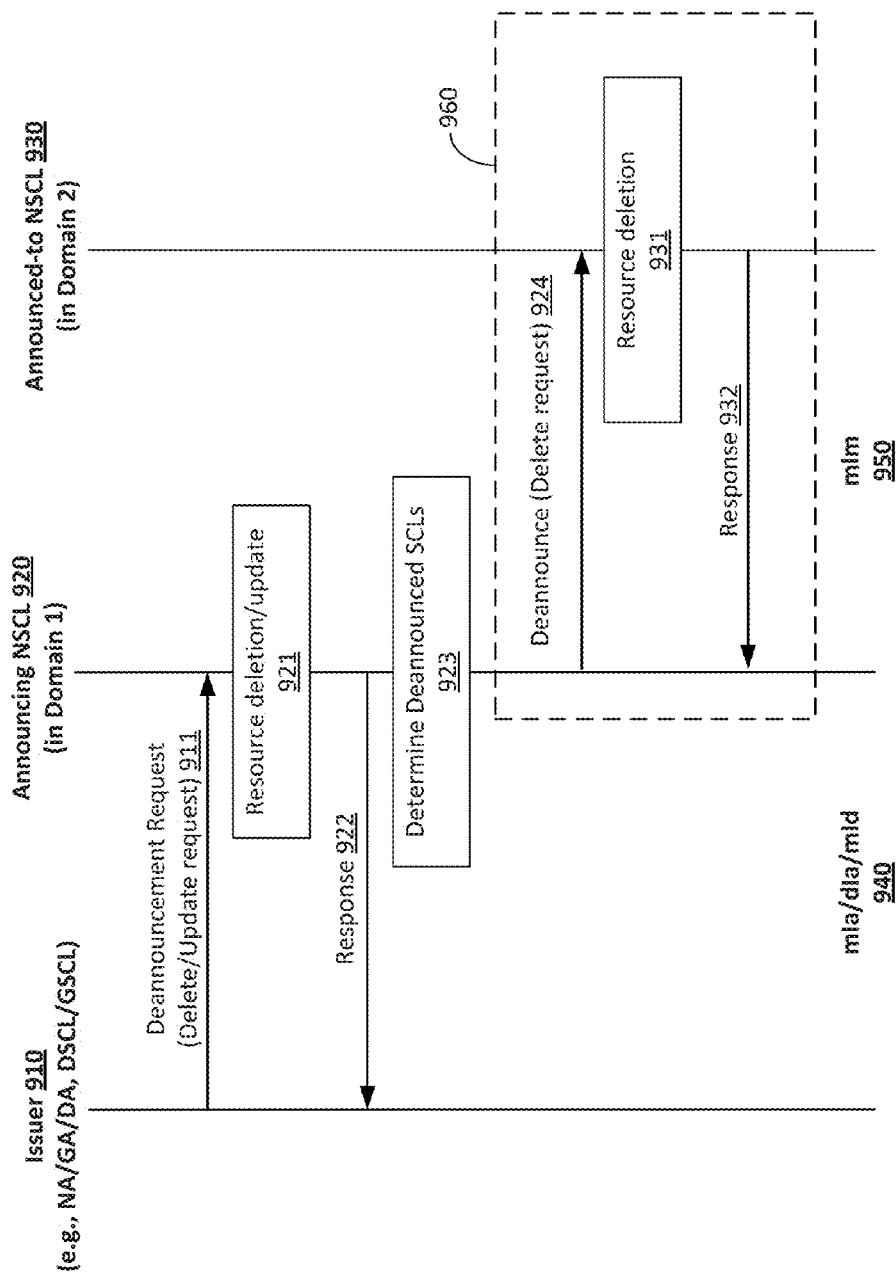
FIG. 9 illustrates an exemplary signal flow of procedures to delete resources between network domains.

In some embodiments, a resource may need to be removed from one or more SCLs, or "deannounced". FIG. 9 illustrates a signal flow of an embodiment of a resource deannouncement procedure for deannouncing a previously announced resource across domains that may use the structures and elements of such structures as described above in regard to FIGS. 3-5. Note that the exemplary embodiments described in regard to FIG. 9 may be used to deannounce any type of resource, including SCL resources. As a result of expiration of a resource (i.e., the time provided in the resource's expirationTime attribute has arrived), because a resource was deleted, or as a result of a change to an announce attribute list for a resource received in Update request 911 from Issuer 910 received over any of the mId, dIa, or mIa reference points 940 (i.e., removal of an SCL that was previously to be announced to), NSCL 920 in Domain 1 may determine that a resource is to be deannounced. In another embodiment, deannouncement request 911 may be a resource Delete request received from issuer 910. NSCL 920 may validate deannouncement request 911 using any means or method set forth herein or otherwise.

If deannouncement request 911 is not successfully validated, NSCL 920 may send response 922 to Issuer 910 informing issuer 910 that deannouncement request 911 was not validated. This may take the form of an error message. If deannouncement request 911 is successfully validated, Announcing NSCL 920 may delete the resource at block 921 if the resource is to be deleted from NSCL 920. Alternatively, where the resource is only to be deleted from, or no longer announced by, a subset of SCLs, NSCL 920 may transmit denouncement requests to such SCLs. Announcing NSCL 920 may also, or instead, update the announce attribute list for the resource at block 921, for example, by updating the announce attribute list of the resource required to be deannounced. Response 922 may be sent to Issuer 910 confirming that Issuer 910 is authorized to perform the deannouncement actions requested in deannouncement request 911. Note that response 922 may be sent prior to the completion of the deannounce procedure or after the deannounce procedure is complete.

At block 923, NSCL 920 may determine the SCLs (i.e., Announced-to SCLs) to which the resource is to be deannounced and transmit Deannounce 924 via reference point mIm 950 to Announced-to NSCL 930, which may be in a different domain (Domain 2) from that of NSCL 920 (Domain 1). Deannounce 924 may be a Delete request requesting the deletion of an announced (in some embodiments, SCL) resource based on a Delete request in deannouncement request 911 or an Update request in request 911 that removes Announced-to NSCL 930 from the announce attribute list of the resource required to be deannounced.

Announced-to NSCL 930 may validate Deannounce 924 using any means or methods disclosed herein or otherwise. At block 931, Announced-to NSCL 930 may attempt to delete the resource if Deannounce 924 has successfully been validated.

Upon completion of the processing at block 931, Announced-to NSCL 930 may transmit response 932 that may indicate whether the deletion of the resource was successful or unsuccessful. If the resource was not successfully deleted from Announced-to NSCL 930 (e.g., because NSCL 920 is not registered at Announced-to NSCL 930, NSCL 920 is not authorized to delete the requested resource on Announced-to NSCL 930, or the attributes included in request 924 are not allowable), NSCL 930 may not delete the resource and may return response 932 containing an error message to NSCL 920. If deletion of the resource at Announced-to NSCL 930 was successful, response may confirm successful deletion of the resource to NSCL 920.

Note that NSCL 920 may also send Deannounce 924 to other NSCLs as well, and therefore the steps within dashed box 960 may be repeated until the resource is deannounced to all NSCLs to which NSCL 920 has determined it should be deannounced. In the example embodiment described in regard to FIG. 9, a resource (SCL or otherwise) is deannounced between two NSCLs using the mIm reference point. However, in other embodiments a similar resource deannouncement mechanism utilizing the <sclAnnc> resource configuration (see, e.g., FIGS. 3, 4, and 5) may be used where SCL resources are deannounced between other types of SCLs, such as between GSCLs, DSCLs, or between any combination of different types of SCLs.

Figure 10:
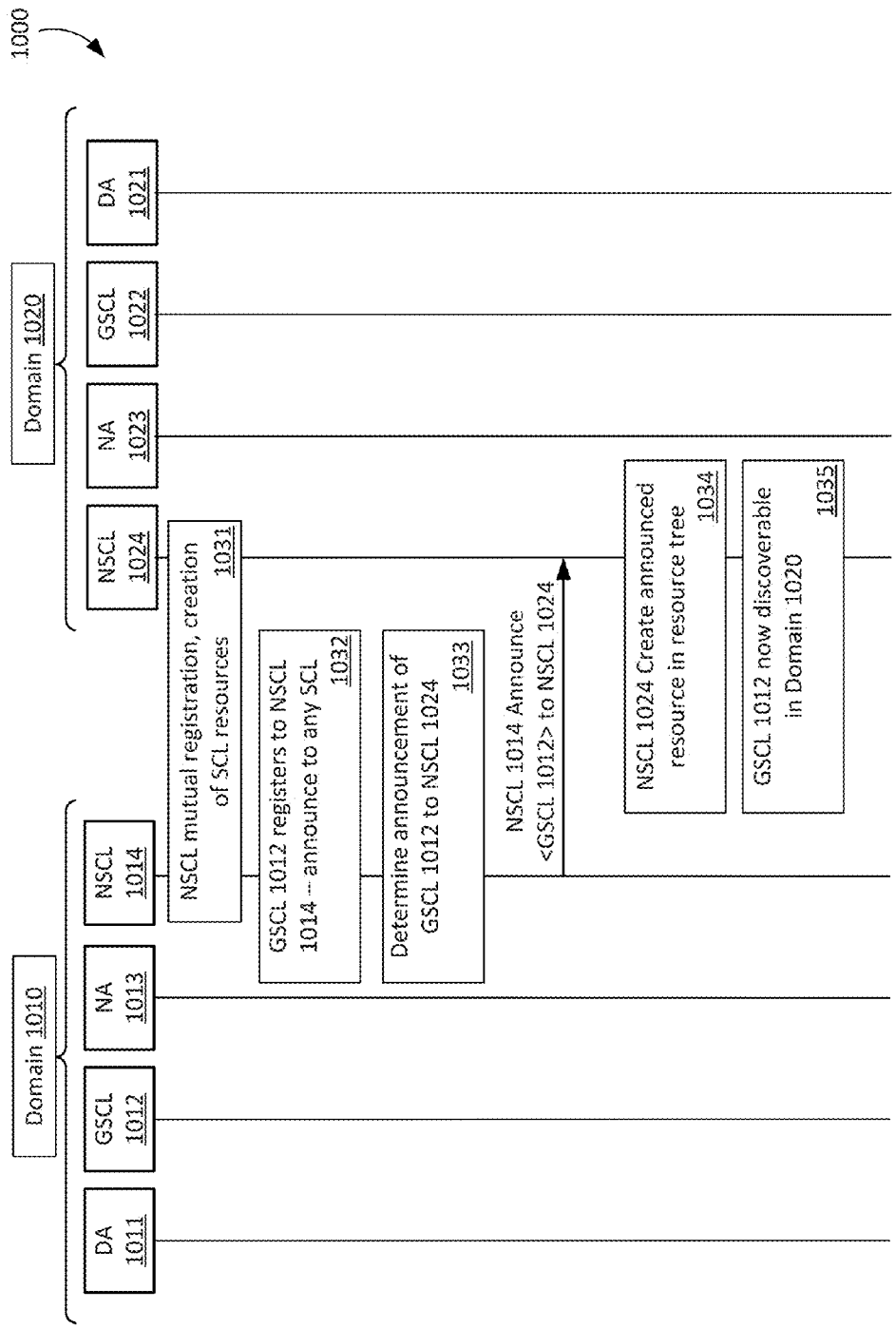
FIG. 10 illustrates an exemplary signal flow of procedures to announce an SCL resource.

FIG. 10 illustrates exemplary signal flow 1000 demonstrating the announcement of an SCL resource utilizing <sclAnnc> (see, e.g., FIGS. 3, 4, and 5) as a resource according to an embodiment. Within network domain 1010 may be DA 1011, GSCL 1012, NA 1013, and NSCL 1014. Within network domain 1020 may be DA 1021, GSCL 1022, NA 1023, and NSCL 1024. In this example, GSCL 1012 will be made discoverable to entities in domain 1020. At block 1031, NSCL 1014 registers with NSCL 1024, and NSCL 1024 registers with NSCL 1014. When NSCL 1024 registers with NSCL 1014, there is a <NSCL 1024> resource created at NSCL 1014 that is an <scl> resource representing registered NSCL 1024 being created by NSCL 1014 (i.e., <NSCL 1014 Base>/scls/<NSCL 1024>). Similarly, when NSCL 1014 registers with NSCL 1024, there is a <NSCL 1014> resource created at NSCL 1024 that is an <scl> resource representing registered NSCL 1014 being created by NSCL 1024 (i.e., <NSCL 1024 Base>/scls/<NSCL 1014>).

At block 1032, GSCL 1012 registers to NSCL 1014. In response, NSCL 1014 creates <GSCL1012>, an <scl> resource representing registered GSCL 1012 under <NSCL 1014 Base>/scls/ (i.e., <NSCL 1014 Base>/scls/<GSCL 1012>). Upon registration, GSCL 1012 may indicate that it may be announced by NSCL 1014 to any other SCLs. Alternatively, GSCL 1012 may indicate specific SCLs to which NSCL 1014 may announce GSCL 1012.

At block 1033, NSCL 1014 may determine when and to which SCLs to announce GSCL 1012, and such announcements may be transmitted over an mIm interface. After NSCL 1014 sends the announcement of GSCL1012 to NSCL 1024, at block 1034 NSCL 1024 may create <GSCL 1012 Annc>, an announced SCL resource configured with an <sclAnnc> resource that represents an active announcement of the GSCL 1012 resource, under <NSCL 1024 Base>/scls/<NSCL 1014> in the resource tree of NSCL 1024 (i.e., <NSCL 1024 Base>/scls/<NSCL 1014>/sclAnnces/<GSCL 1012 Annc>). The resource <GSCL 1012 Annc> may contain a link to the URI of the GSCL 1012 resource stored at NSCL 1014. Thus, GSCL 1012 is now discoverable to SCLs and applications in domain 1020.

Figure 11:
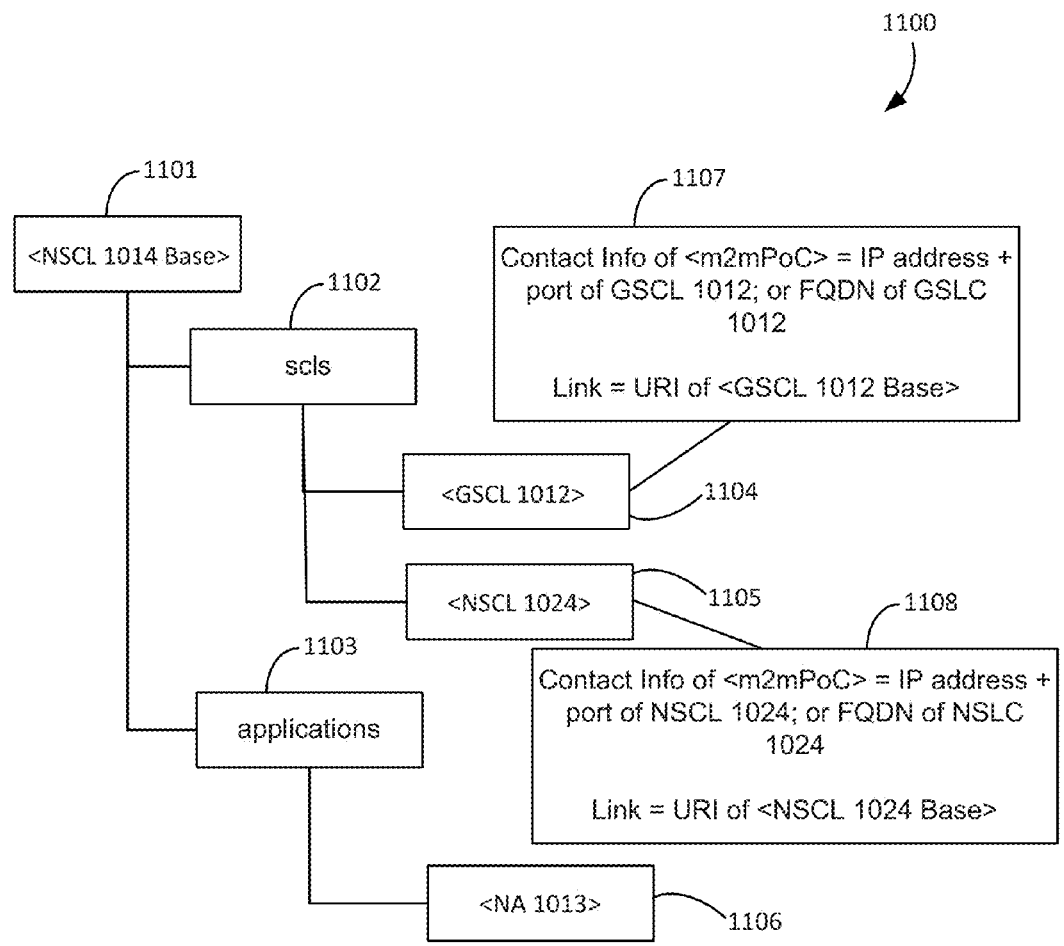
FIG. 11 illustrates an exemplary resource tree structure.

FIG. 11 illustrates an example resource tree 1100 generated by the signal flow of FIG. 10 at NSCL 1014. Block 1101 is <NSCL 1014 Base>, under which applications branch 1103 and scls branch 1102 may be located. Off of applications branch 1103 may be block 1106 containing a representation of the <NA 1013> resource. Off of scls branch 1102 may be block 1104 containing a representation of the <GSCL 1012> SCL resource that may contain data 1107 that may include contact information and a link to the resource. Also off of scls branch 1102 may be block 1105 containing a representation of the <NSCL 1024> SCL resource in domain 1020 that may contain data 1108 that may include contact information and a link to the resource.

Figure 12:
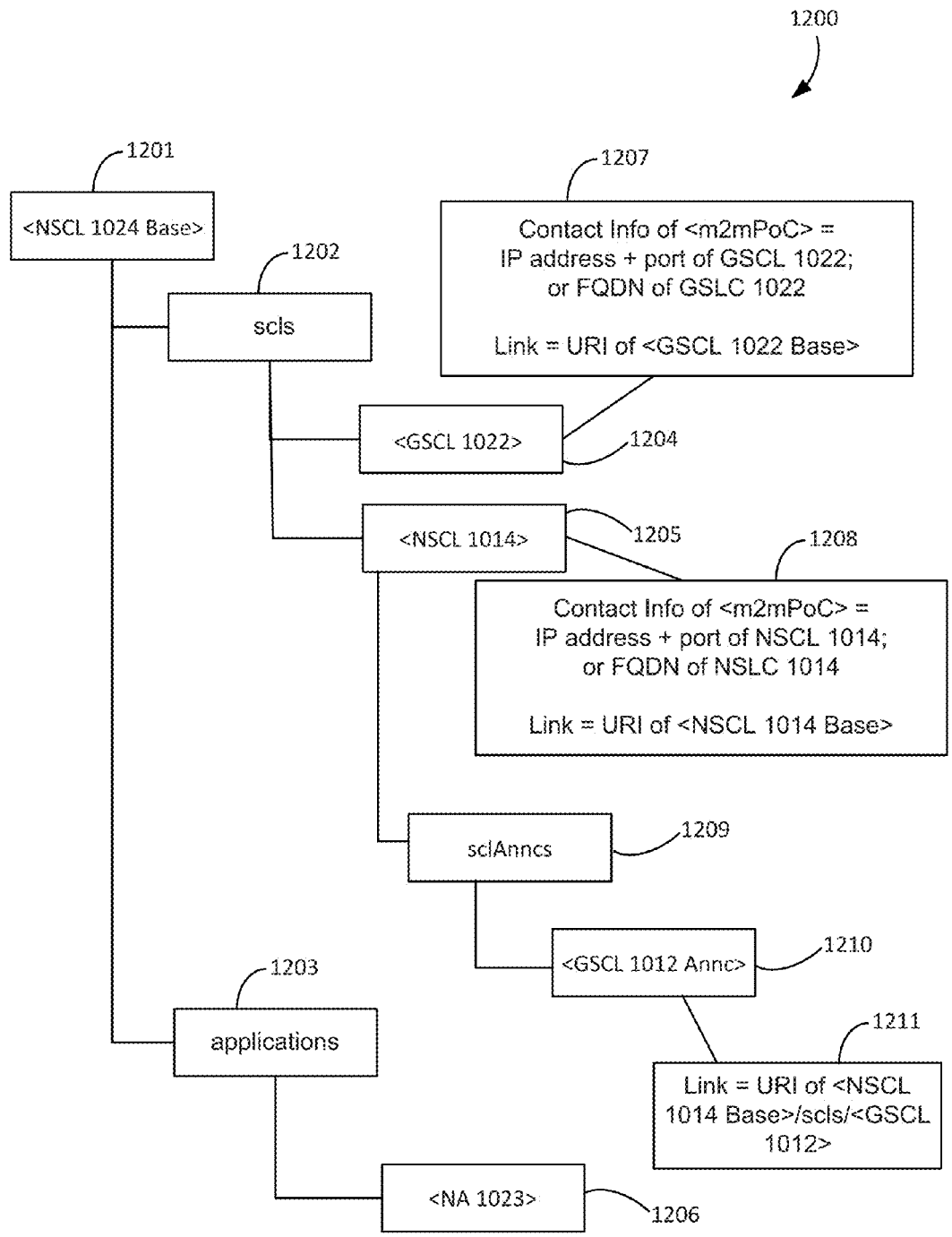
FIG. 12 illustrates an exemplary resource tree structure.

FIG. 12 illustrates an example resource tree 1200 generated by the signal flow of FIG. 10 at NSCL 1024. Block 1201 is <NSCL 1024 Base>, under which applications branch 1203 and scls branch 1202 may be located. Off of applications branch 1203 may be block 1206 containing a representation of the <NA 1023> resource. Off of scls branch 1202 may be block 1204 containing a representation of the <GSCL 1022> SCL resource that may contain data 1207 that may include contact information and a link to the resource. Also off of scls branch 1202 may be block 1205 containing a representation of the <NSCL 1014> SCL resource in domain 1010 that may contain data 1208 that may include contact information and a link to the resource. Under block 1205 may be sclAnncs branch 1209, under which may be located block 1210 representing the GSCL 1014 resource as <GSCL 1014 Annc>. Block 1210 may include a link as shown at block 1211 to the GSCL 1012 resource (e.g., URI of <NSCL 1014 Base>/scls/<GSCL 1012> or URI of <GSCL1012Base>).

Figure 13:
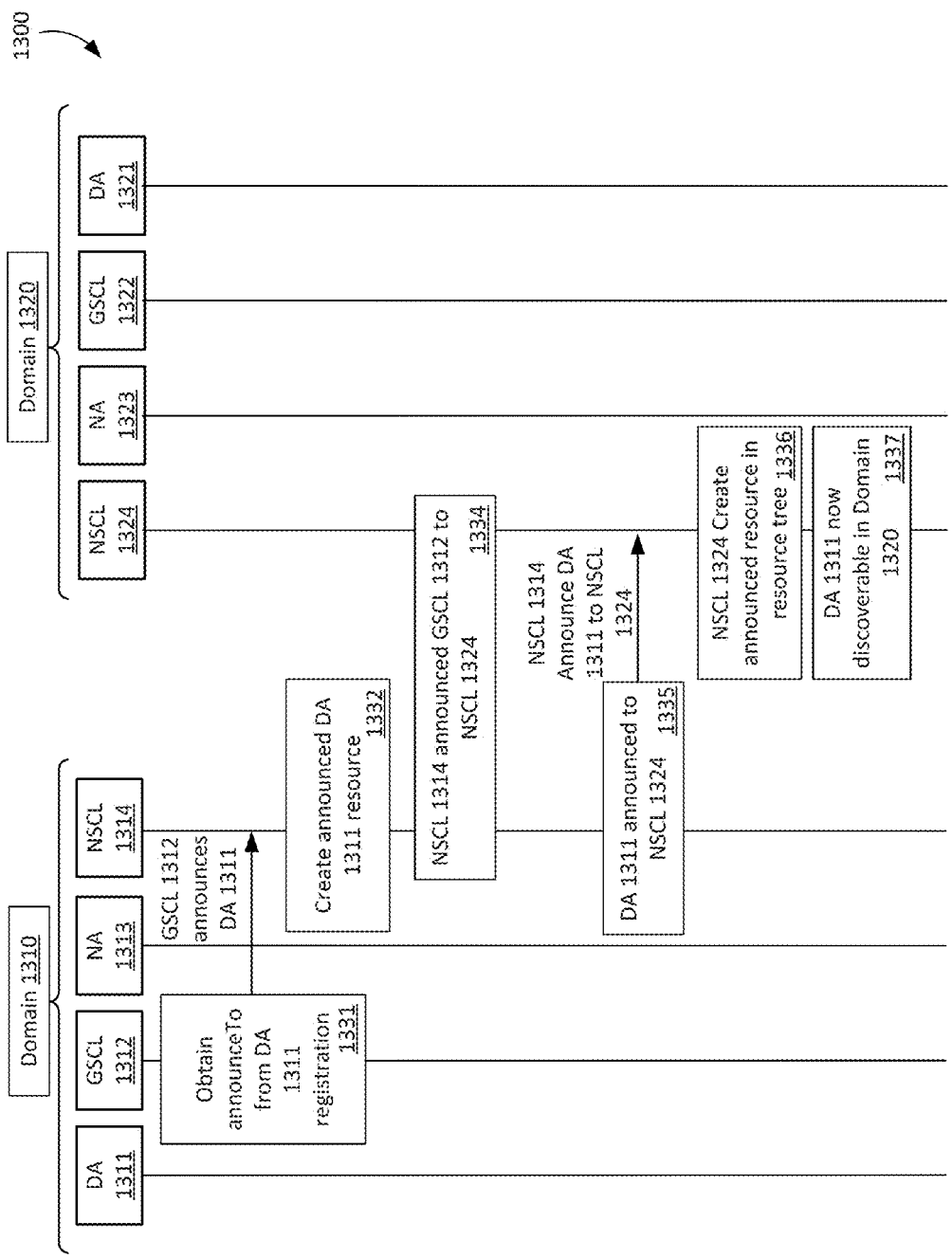
FIG. 13 illustrates an exemplary signal flow of procedures to announce a subresource of an announced SCL resource.

FIG. 13 illustrates exemplary signal flow 1300 demonstrating the announcement of an application as a subresource of an announced SCL resource according to an embodiment. Within network domain 1310 may be DA 1311, GSCL 1312, NA 1313, and NSCL 1314. Within network domain 1320 may be DA 1321, GSCL 1322, NA 1323, and NSCL 1324. In this example, DA 1311 will be made discoverable to entities in domain 1320. At block 1331, DA 1311 registers to GSCL 1312 and indicates that GSCL 1312 may announce DA 13111 to any SCLs. Alternatively, DA 1311 may indicate specific SCLs to which GSCL 1312 may announce, DA 1311. GSCL 1312 announces DA 1311 to NSCL 1314, and any other SCLs in domain 1310 to which it may be permitted to announce DA 1311.

When GSCL 1312 announced DA 1311 to NSCL 1314, at block 1332 NSCL1314 created <DA 1311 Annc>, an announced resource representing an active announcement of DA 1311, under <NSCL 1314 Base>/scls/<GSCL 1312>/applications/ to represent the announced resource of DA 1311 at NSCL 1314 (i.e., <NSCL 1314 Base>/scls/<GSCL 1312>/applications/<DA 1311 Annc>). At block 1334, NSCL 1314 announces GSCL 1312 to NSCL 1324, for example as demonstrated in FIG. 10. Because there are applications registered to GSCL 1312, NSCL 1314 may announce those applications registered to GSCL 1312 to NSCL 1324. DA 1311 is an example of one such application. At block 1335, NSCL 1314 sends an Announce request to NSCL 1324 requesting that NSCL 1324 announce DA 1311. At block 1336, NSCL 1324 creates the announced resource of DA 1311, <DA 1311 Annc>, under <NSCL 1324 Base>/scls/<NSCL 1314>/sclAnncs/<GSCLAnnc>/applications/ (i.e., <NSCL 1324 Base>/scls/<NSCL 1314>/sclAnncs/<GSCLAnnc>/applications/<DA 1311 Annc>). Upon completion of this step, at block 1337, DA 1311, originally only "visible" at GSCL 1312 as an application behind a gateway, is made visible at NSCL 1314 and then at NSCL 1324 in domain 1320. Thus, DA 1311 becomes discoverable for SCLs and applications in in domain 1320.

Figure 14:
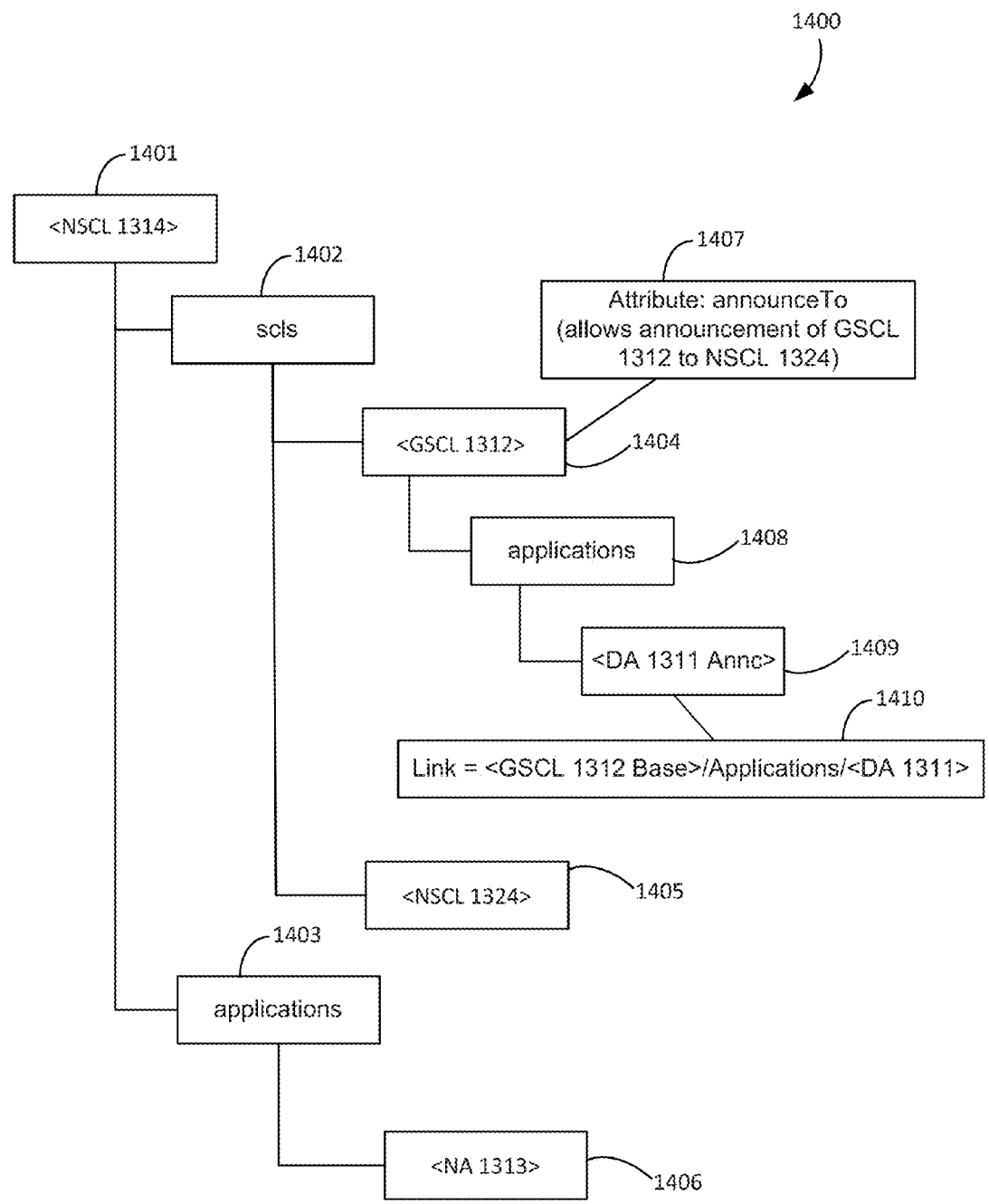
FIG. 14 illustrates an exemplary resource tree structure.

FIG. 14 illustrates an example resource tree 1400 generated by the signal flow of FIG. 13 at NSCL 1314. Block 1401 is <NSCL 1314 Base>, under which applications branch 1403 and scls branch 1402 may be located. Off of applications branch 1403 may be block 1406 containing a representation of the <NA 1313> resource. Off of scls branch 1402 may be block 1404 containing a representation of the <GSCL 1312> SCL resource, which is registered to NSCL 1314, that may contain data 1407. Data 1407 may include attributes for this SCL resource, including a list of SCLs to which GSCL 1312 may be announced. Also off of scls branch 1402 may be block 1405 containing a representation of the <NSCL 1324> SCL resource in domain 1320.

Under block 1404 representing the <GSCL 1312> SCL resource may be application branch 1408, a collection resource of application resources. Under application branch 1408 may be block 1409 that may be the resource <DA 1311 Annc>, an announced resource representing an active announcement of the DA 1311 resource. This resource may include a link to the original resource, such as <GSCL 1312 Base>/Applications/<DA 1311>.

Figure 15:
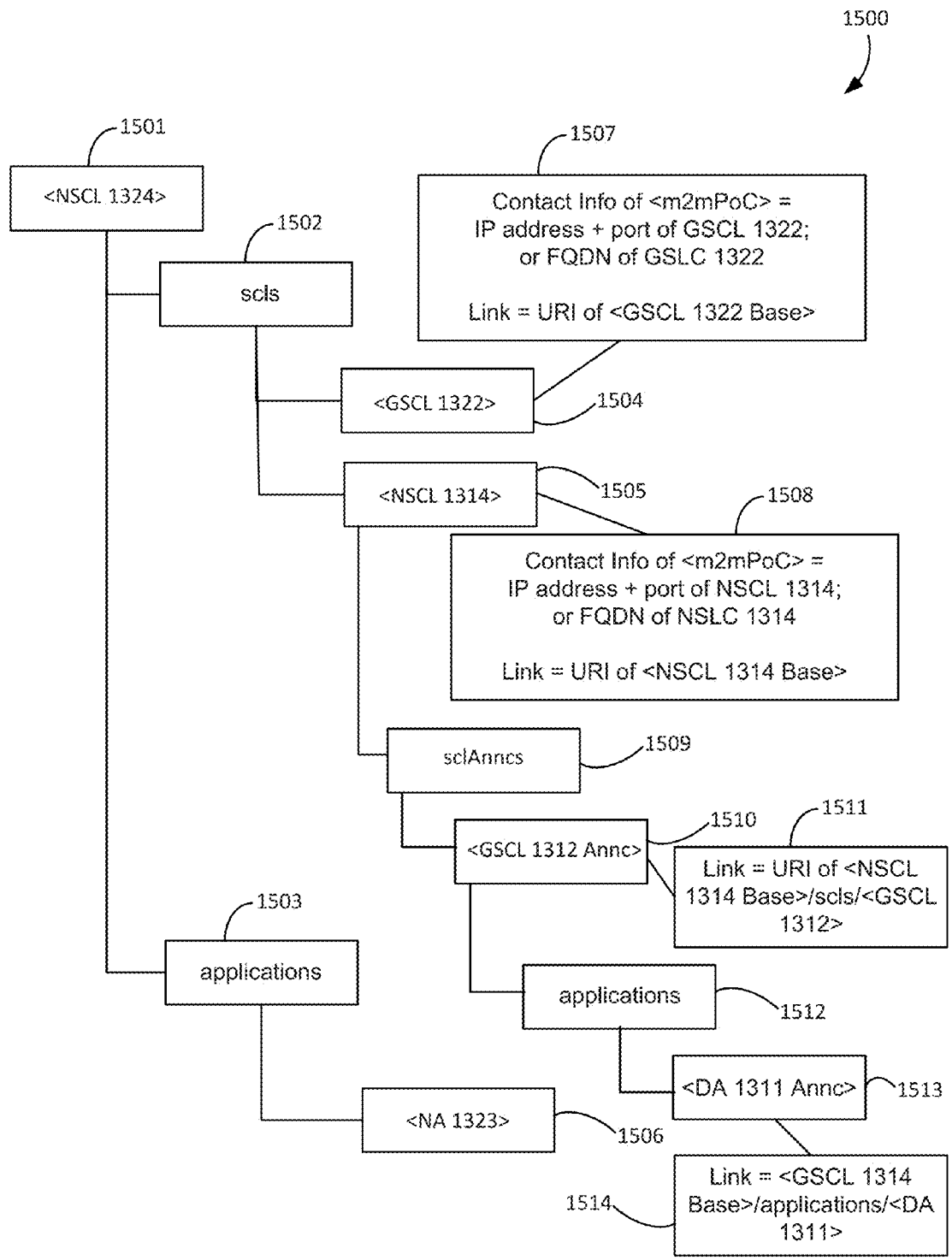
FIG. 15 illustrates an exemplary resource tree structure.

FIG. 15 illustrates an example resource tree 1500 generated by the signal flow of FIG. 13 at NSCL 1324. Block 1501 is <NSCL 1324 Base>, under which applications branch 1503 and scls branch 1502 may be located. Off of applications branch 1503 may be block 1506 containing a representation of the <NA 1523> resource. Off of scls branch 1502 may be block 1504 containing a representation of the <GSCL 1322> SCL resource that may contain data 1507 that may include contact information and a link to the resource. Also off of scls branch 1502 may be block 1505 containing a representation of the <NSCL 1314> SCL resource in domain 1310 that may contain data 1508 that may include contact information and a link to the resource. Under block 1505 may be sclAnncs branch 1509, a collection resource of announced SCL resources, under which may be located block 1510 representing the GSCL 1312 resource as <GSCL 1312 Annc>, an announced SCL resource representing an active announcement of the GSCL 1312 resource. Block 1510 may include a link at block 1511 to the GSCL 1312 resource (e.g., URI of <NSCL 1314 Base>/scls/<GSCL 1312> or URI of <GSCL1312Base>). Under block 1510 representing the announced GSCL 1312 SCL resource may be application block 1512 (a collection of application resources), under which may be block 1513, an announced resource representing an active announcement of the DA 1311 resource as <DA 1311 Annc>. <DA 1311 Annc> may include a link to that resource as shown in block 1514.

Figure 16A:
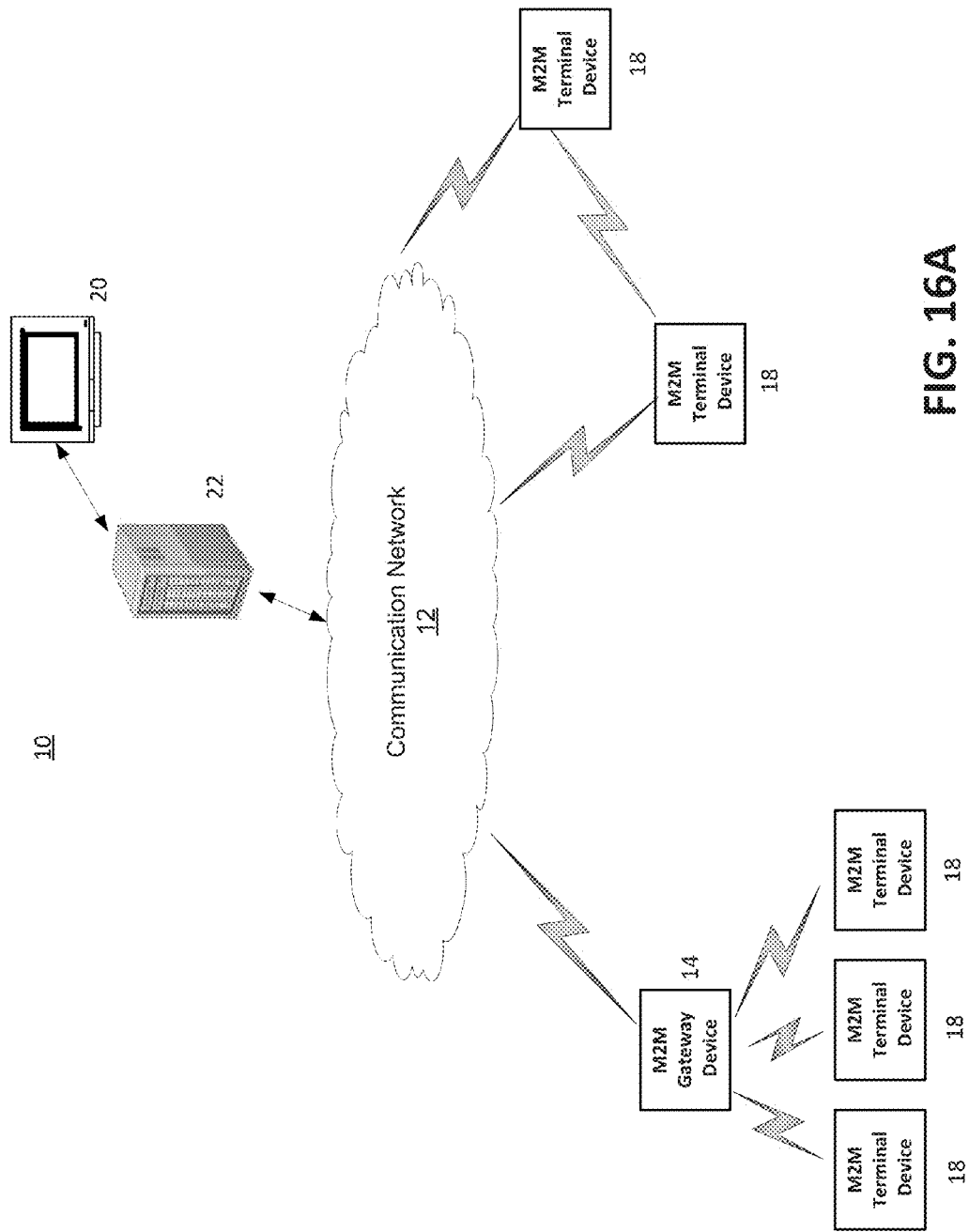
FIG. 16A is a system diagram of an example machine-to-machine (M2M) or Internet of Things (IoT) communication system in which one or more disclosed embodiments may be implemented.

FIG. 16A is a diagram of an example M2M or IoT communication system 10 in which one or more disclosed embodiments of systems and methods for service layer resource propagation, such as announcement or deannouncement of SCL resources, may be implemented. Generally, M2M technologies provide building blocks for the IoT, and any M2M device, gateway or service platform may be a component of the IoT as well as an IoT service layer, etc.

As shown in FIG. 16A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 16A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 16B:
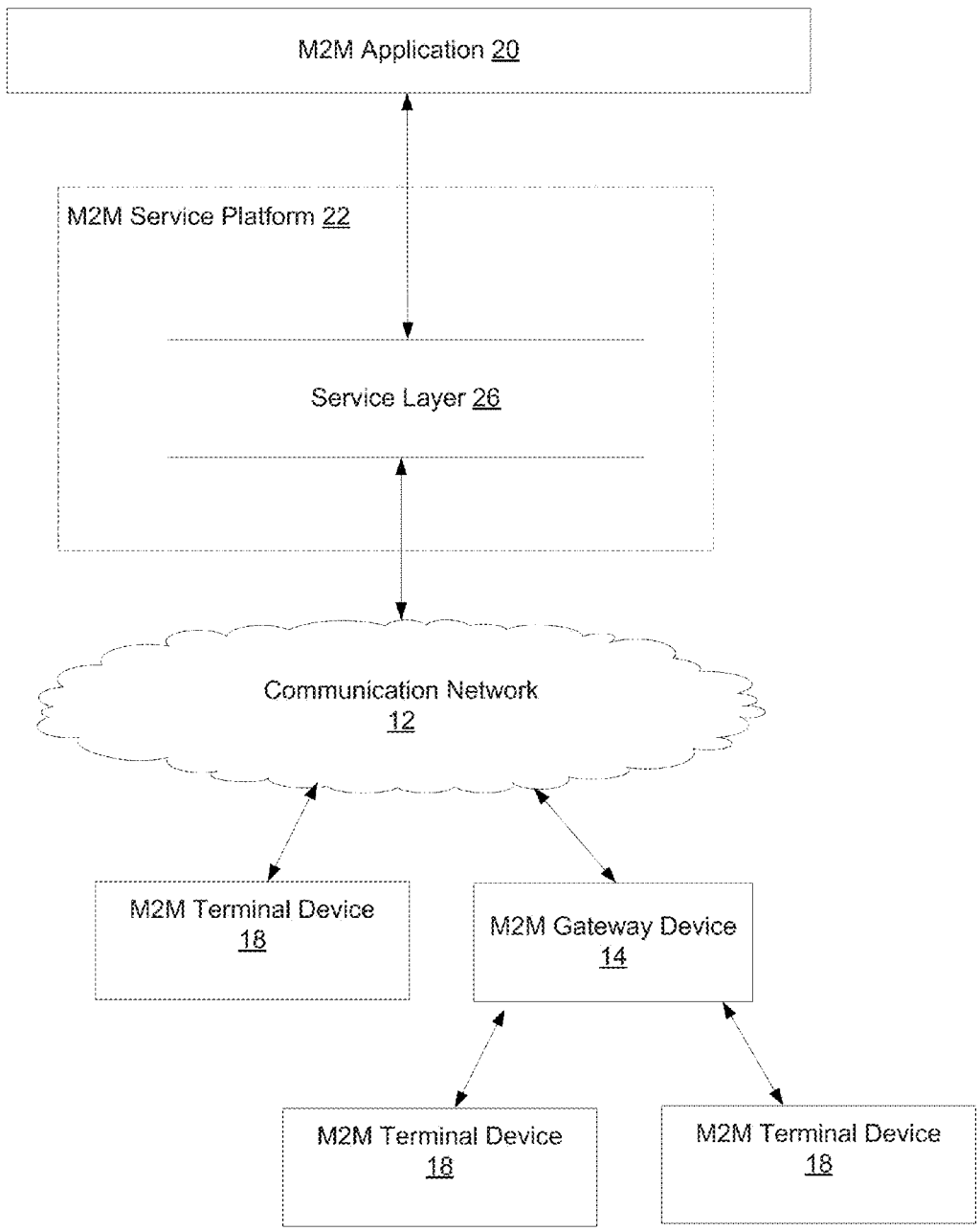
FIG. 16B is a system diagram of an example architecture that may be used within the M2M/IoT communications system illustrated in FIG. 16A.

Referring also to FIG. 16B, the M2M service platform typically implements a service layer 26 (e.g. a network service capability layer (NSCL) as described herein) that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more peer-to-peer networks that include devices that may use the disclosed of systems and methods for service layer resource propagation, such as announcement or deannouncement of SCL resources. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 16C:
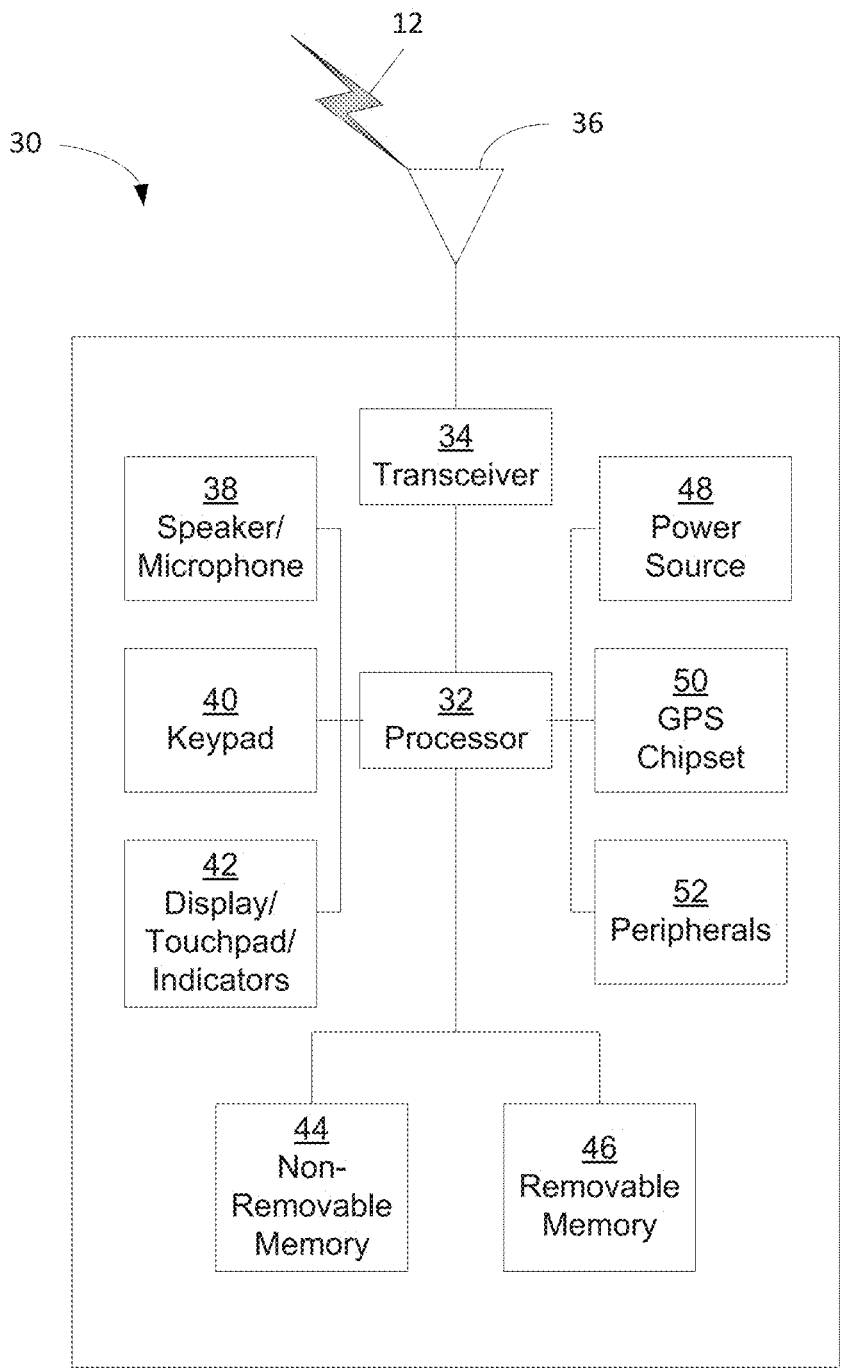
FIG. 16C is a system diagram of an example M2M/IoT terminal or gateway device that may be used within the communications system illustrated in FIG. 16A.

FIG. 16C is a system diagram of an example M2M device 30, such as an M2M terminal device 18 or an M2M gateway device 14 for example. As shown in FIG. 16C, the M2M device 30 may include a processor 32, a transceiver 34, a transmit/receive element 36, a speaker/microphone 38, a keypad 40, a display/touchpad/indicators (e.g., one or more light emitting diodes (LEDs)) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed of systems and methods for service layer resource propagation, such as announcement or deannouncement of SCL resources.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 16C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an M2M service platform 9. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 16C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to whether the resource propagation (e.g., announcement or denouncement of SCL resources) in some of embodiments described herein is successful or unsuccessful, or otherwise indicate the status of resource propagation processes.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 16D:
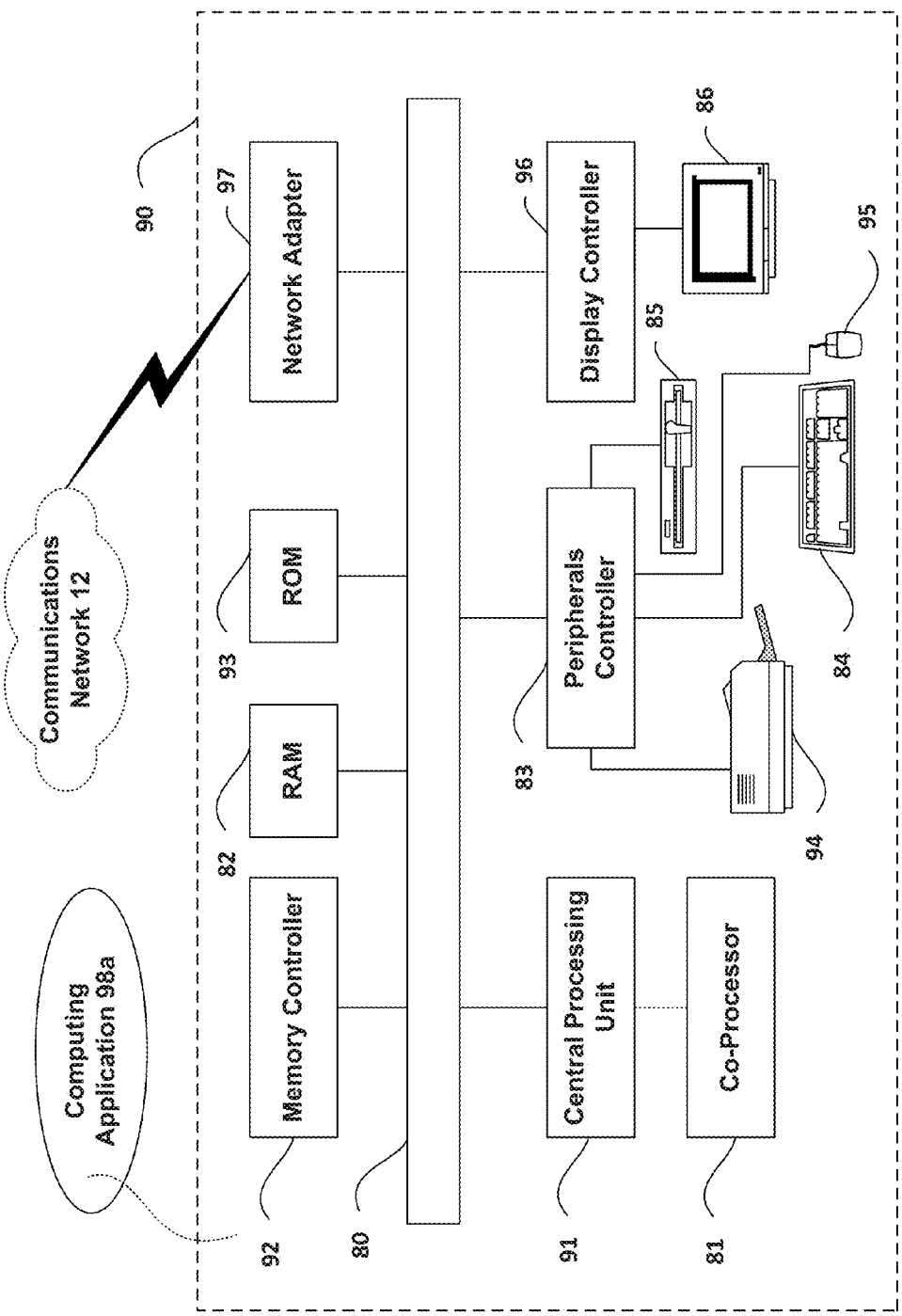
FIG. 16D is a block diagram of an example computing system in which aspects of the communication system of FIG. 16A may be embodied.

FIG. 16D is a block diagram of an exemplary computing system 90 on which, for example, the M2M service platform 22 of FIGS. 16A and 16B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed of systems and methods for service layer resource propagation, such as the announcement or deannouncement of SCL resources.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 16A and 16B. In an embodiment, network adaptor 97 may receive and transmit data related to the disclosed of systems and methods for service layer resource propagation, such as the announcement or deannouncement of SCL resources.

It is understood that any or all of the systems, methods, and processes described herein may be embodied in the form of computer executable instructions (i.e., program code) stored on a computer-readable storage medium embodied as a physical device or apparatus. Such instructions, when executed by a machine, or a processor configured in a machine, such as a computer, server, M2M terminal device, M2M gateway device, or the like, effectuate, perform, and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A first network node implementing a first machine-to-machine services capabilities layer entity in a communication network, the first network node comprising:
   a memory comprising executable instructions; and
   a processor that, when executing the executable instructions, effectuates operations comprising:
   managing at least one resource representing a machine-to-machine services capabilities layer entity itself;
   determining to announce the at least one resource representing the machine-to-machine services capabilities layer entity to a second machine-to-machine services capabilities layer entity implemented on a second network node,
   generating an announcement advertising the at least one resource representing the machine-to-machine services capabilities layer entity and available at the first machine-to-machine services capabilities layer entity;
   transmitting the announcement of the at least one resource representing the machine-to-machine services capabilities layer entity to the second machine-to-machine services capabilities layer entity; and
   receiving, by the first machine-to-machine services capabilities layer entity, a response from the second machine-to-machine services capabilities layer entity.

2. The first network node of claim 1, wherein the first machine-to-machine services capabilities layer entity comprises a network services capabilities layer entity operating in a first network domain and the second machine-to-machine services capabilities layer entity comprises a network services capabilities layer entity operating in a second network domain.

3. The first network node of claim 1, wherein the at least one resource comprises a resource data structure comprising a first subresource data structure comprising a second subresource data structure representing the machine-to-machine services capabilities layer entity.

4. The first network node of claim 1, wherein the operations further comprise:
   receiving a request from a third machine-to-machine services capabilities layer entity implemented on a third network node to register another set of resources to the resources of the first machine-to-machine services capabilities layer entity, wherein the another set of resources are available at the third machine-to-machine services capabilities layer entity; and
   registering the another set of resources to the resources of the first machine-to-machine services capabilities layer.

5. The first network node of claim 1, wherein the operations further comprise:
   receiving a request from a third machine-to-machine services capabilities layer entity implemented on a third network node to remove a set of resources available at the third machine-to-machine services capabilities layer entity, wherein the set of resources available at the third machine-to-machine services capabilities layer entity are registered in the first machine-to-machine services capabilities layer entity; and
   removing the set of resources available at the third machine-to-machine services capabilities layer entity from the first machine-to-machine services capabilities layer entity.

6. The first network node of claim 1, wherein the operations further comprise:
   receiving a request from a third machine-to-machine services capabilities layer entity implemented on a third network node to update a set of resources available at the third machine-to-machine services capabilities layer entity, wherein the set of resources available at the third machine-to-machine services capabilities layer entity are registered in the first machine-to-machine services capabilities layer entity; and
   updating the set of resources available at the third machine-to-machine services capabilities layer entity in the first machine-to-machine services capabilities layer entity.

7. A first network node implementing a first machine-to-machine services capabilities layer entity in a communication network, the first network node comprising:
   a memory comprising executable instructions; and
   a processor that, when executing the executable instructions, effectuates operations comprising:
      managing a first set of resources of a machine-to-machine services capabilities layer entity;
      receiving a request from a second machine-to-machine services capabilities layer entity implemented on a second network node to register a second set of resources of the second machine-to-machine services capabilities layer entity, which are available at the second machine-to-machine services capabilities layer entity and which each represent a machine-to-machine services capabilities entity itself, to the first machine-to-machine services capabilities layer entity;
      registering the second set of resources of the second machine-to-machine services capabilities layer entity to the first machine-to-machine services capabilities layer entity;
      determining to announce the second set of resources available at the second machine-to-machine services capabilities layer entity to a third machine-to-machine services capabilities layer entity implemented on a third network node,
      generating an announcement advertising the second set of resources available at the second machine-to-machine services capabilities layer entity;
      transmitting the announcement to the third machine-to-machine services capabilities layer entity; and
      receiving, by the first machine-to-machine services capabilities layer entity, a response from the third machine-to-machine services capabilities layer entity.

8. The first network node of claim 7, wherein the first machine-to-machine services capabilities layer entity comprises a network services capabilities layer entity operating in a first network domain and the third machine-to-machine services capabilities layer entity comprises a network services capabilities layer entity operating in a second network domain.

9. The first network node of claim 7, wherein the operations further comprise transmitting a response to the second machine-to-machine services capabilities layer entity.

10. The first network node of claim 7, wherein the second set of resources comprise a resource data structure comprising a first subresource data structure comprising a second subresource data structure representing the second machine-to-machine services capabilities layer entity.

11. The first network node of claim 7, wherein the operations further comprise:
   receiving a request from a fourth machine-to-machine services capabilities layer entity implemented on a fourth network node to remove a fourth set of resources available at the fourth machine-to-machine services capabilities layer entity, wherein the fourth set of resources are registered in the first machine-to-machine services capabilities layer entity; and
   removing the fourth set of resources from the first machine-to-machine services capabilities layer entity.

12. The first network node of claim 7, wherein the operations further comprise:
   receiving a request from the second machine-to-machine services capabilities layer entity to update the second set of resources available at the second machine-to-machine services capabilities layer entity; and
   updating the second set of resources registered in the first machine-to-machine services capabilities layer entity.

13. A method comprising:
   managing, by a processor of a first network node implementing a first machine-to-machine services capabilities layer entity, a first resource representing a machine-to-machine services capabilities layer entity itself;
   determining, by the processor, to announce the first resource to a second machine-to-machine services capabilities layer entity implemented on a second network node,
   generating, by the processor, an announcement advertising the first resource available at the first machine-to-machine services capabilities layer entity;
   instructing, by the processor, a transmitter to transmit the announcement of the first resource of the first machine-to-machine services capabilities layer entity to the second machine-to-machine services capabilities layer entity; and
   receiving, by the processor, a response from the second machine-to-machine services capabilities layer entity.

14. The method of claim 13, wherein the first machine-to-machine services capabilities layer entity comprises a network services capabilities layer entity operating in a first network domain and the second machine-to-machine services capabilities layer entity comprises a network services capabilities layer entity operating in a second network domain.

15. The method of claim 13, wherein the first resource of the first machine-to-machine services capabilities layer entity comprises a resource data structure comprising a first subresource data structure comprising a second subresource data structure representing the first machine-to-machine services capabilities layer entity.

16. The method of claim 13, further comprising:
receiving a request from a third machine-to-machine services capabilities layer entity implemented on a third network node to register a resource of the third machine-to-machine services capabilities layer entity with the first machine-to-machine services capabilities layer entity, wherein the resource of the third machine-to-machine services capabilities layer entity with the first machine-to-machine services capabilities layer entity is available at the third machine-to-machine services capabilities layer entity; and
registering the resource of the third machine-to-machine services capabilities layer entity with the first machine-to-machine services capabilities layer entity.

17. The method of claim 13, further comprising:
receiving a request from a third machine-to-machine services capabilities layer entity implemented on a third network node to remove a resource of the third machine-to-machine services capabilities layer entity, wherein the resource of the third machine-to-machine services capabilities layer entity is registered in the first machine-to-machine services capabilities layer entity; and
removing the resource of the third machine-to-machine services capabilities layer entity from the first machine-to-machine services capabilities layer entity.

* * * * *